United States Patent [19]
Seagle

[11] Patent Number: 6,158,108
[45] Date of Patent: Dec. 12, 2000

[54] METHOD OF MAKING MAGNETIC HEAD WITH VIALESS LEAD LAYERS FROM MR SENSOR TO PADS

[75] Inventor: David John Seagle, Morgan Hill, Calif.

[73] Assignee: International Business Machines Corporation, Armonk, N.Y.

[21] Appl. No.: 09/281,730

[22] Filed: Mar. 30, 1999

Related U.S. Application Data

[62] Division of application No. 08/873,520, Jun. 12, 1997, Pat. No. 5,936,811.

[51] Int. Cl.[7] .................................................. G11B 5/42
[52] U.S. Cl. ................................. 29/603.14; 29/603.15; 360/113
[58] Field of Search ........................... 29/603.14, 603.15, 29/603.13; 360/113

[56] References Cited

U.S. PATENT DOCUMENTS

| | | | |
|---|---|---|---|
| 5,312,644 | 5/1994 | Schwarz et al. | 427/130 |
| 5,557,492 | 9/1996 | Gill et al. | 360/113 |
| 5,617,277 | 4/1997 | Chen et al. | 360/113 |
| 5,653,013 | 8/1997 | Gill et al. | 29/603.14 |
| 5,703,738 | 12/1997 | Kim et al. | 360/113 |
| 5,722,157 | 3/1998 | Shouji et al. | 29/603.14 |
| 5,748,413 | 5/1998 | Lederman et al. | 360/113 |
| 5,748,414 | 5/1998 | Kim et al. | 360/113 |
| 5,809,636 | 9/1998 | Shouji et al. | 29/603.14 |
| 5,966,800 | 10/1999 | Huai et al. | 29/603.13 |

*Primary Examiner*—Carl E. Hall
*Attorney, Agent, or Firm*—Gray Cary Ware & Friedenrich LLP; Ervin F. Johnston

[57] ABSTRACT

A magnetic head is provided that has an extremely small first shield layer and first and second leads of a read head that extend from a magnetoresistive (MR) sensor to first and second pads without any vias therebetween. This is accomplished by patterning the first shield layer into its final shape before the first gap layer and subsequent layers are formed. An alumina mask with a recess at the ABS of the size of the first shield layer is formed followed by forming the first shield layer in the recess. A very thin first gap layer and an optional supplemental first gap layer are then formed, the supplemental first gap layer insulating any potential exposure of the first shield layer at its junction with the alumina layer. After constructing the MR sensor, first and second leads for the MR sensor are constructed from the MR sensor to sites of the first and second pads. Each of these leads may comprise a single thin film or a first thin film which is connected to the MR and extends past a boundary of the first shield layer and a second thin film which overlays the first film and extends from a location slightly spaced from the MR sensor to the first and second pad sites. With this arrangement the leads for the read head extend from the MR sensor to the pad sites without any vias thereby eliminating processing steps. Further, since the size of the shield is not dictated by the size of the initial leads the first shield layer can be much smaller to promote a more robust head.

14 Claims, 20 Drawing Sheets

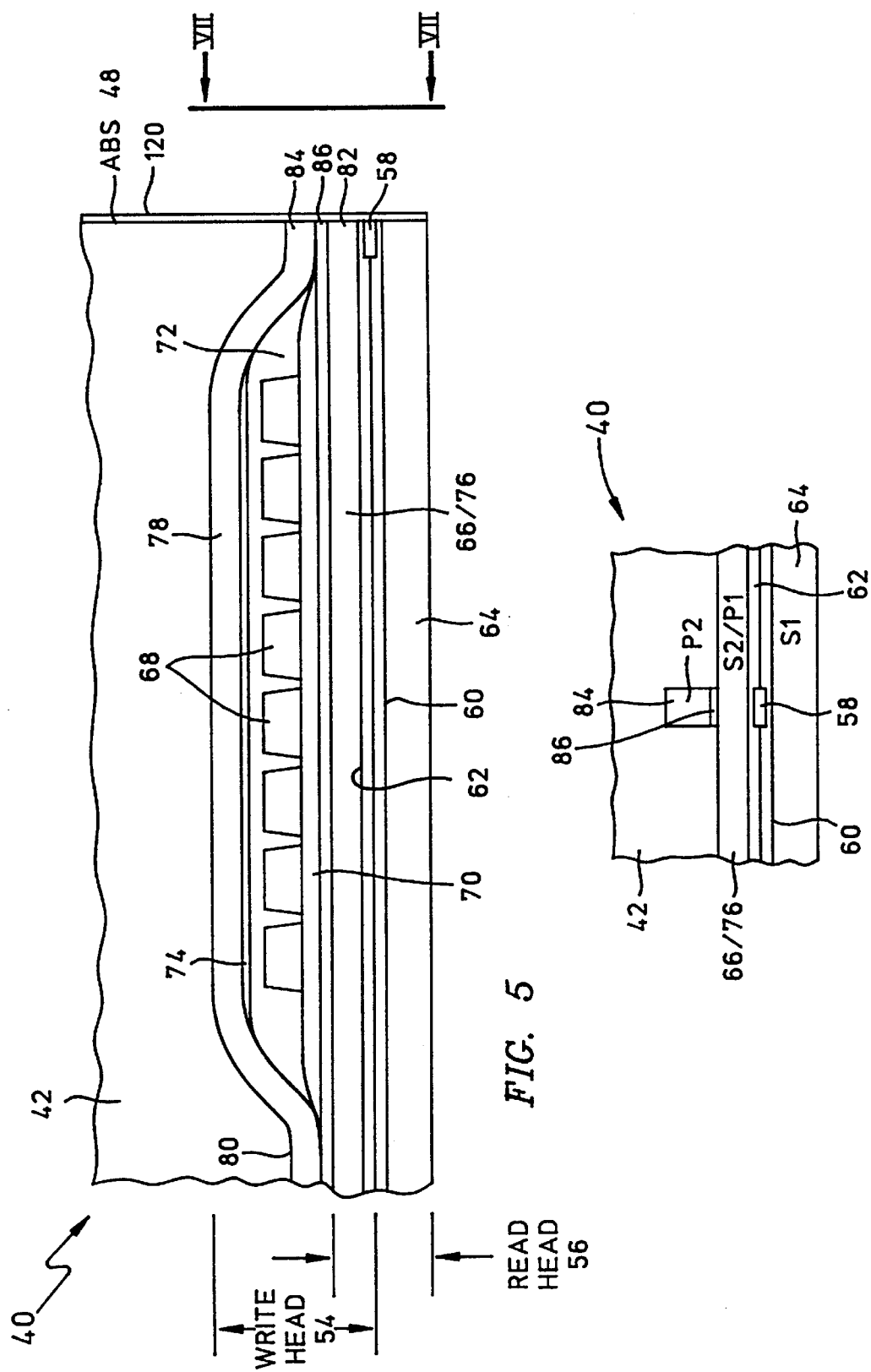

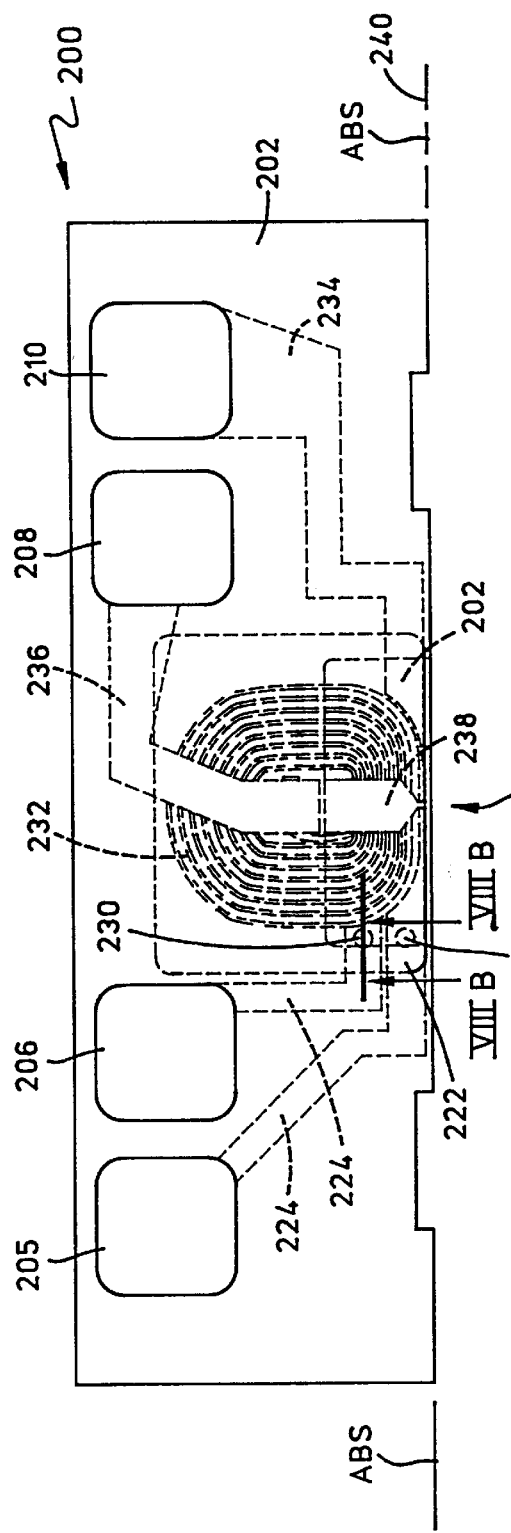
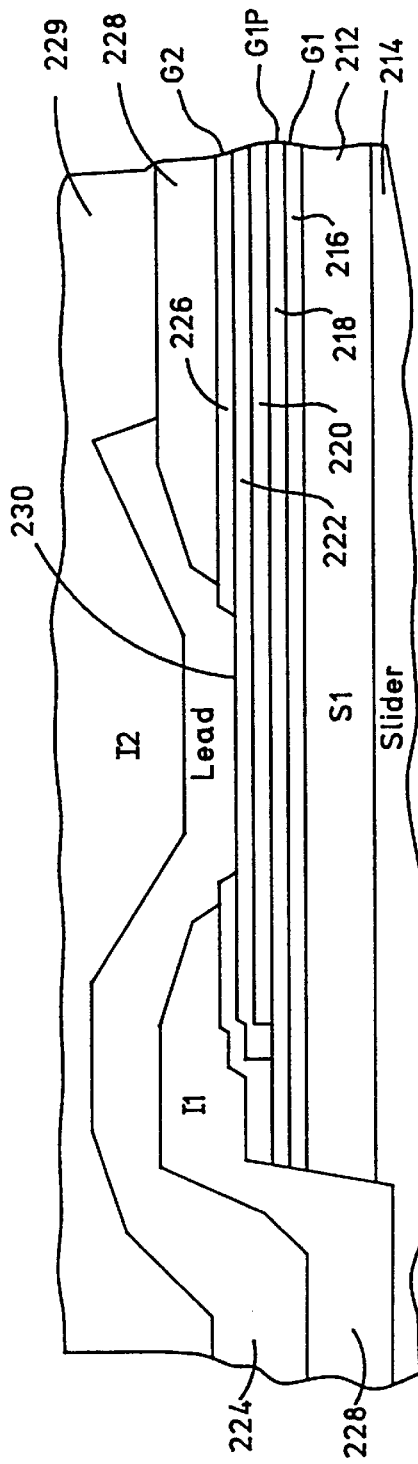
FIG. 8A (Prior Art)
FIG. 8B (Prior Art)

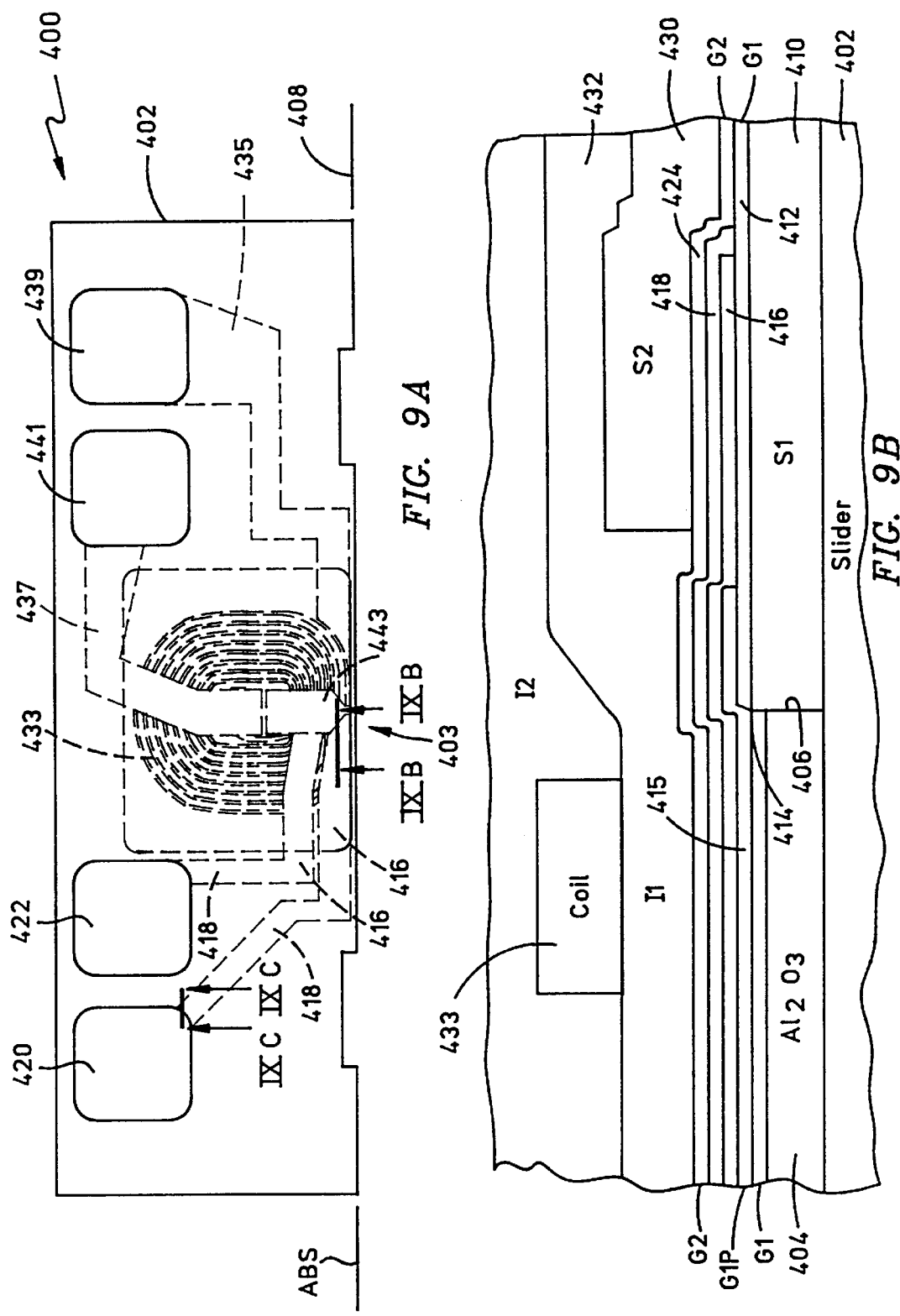

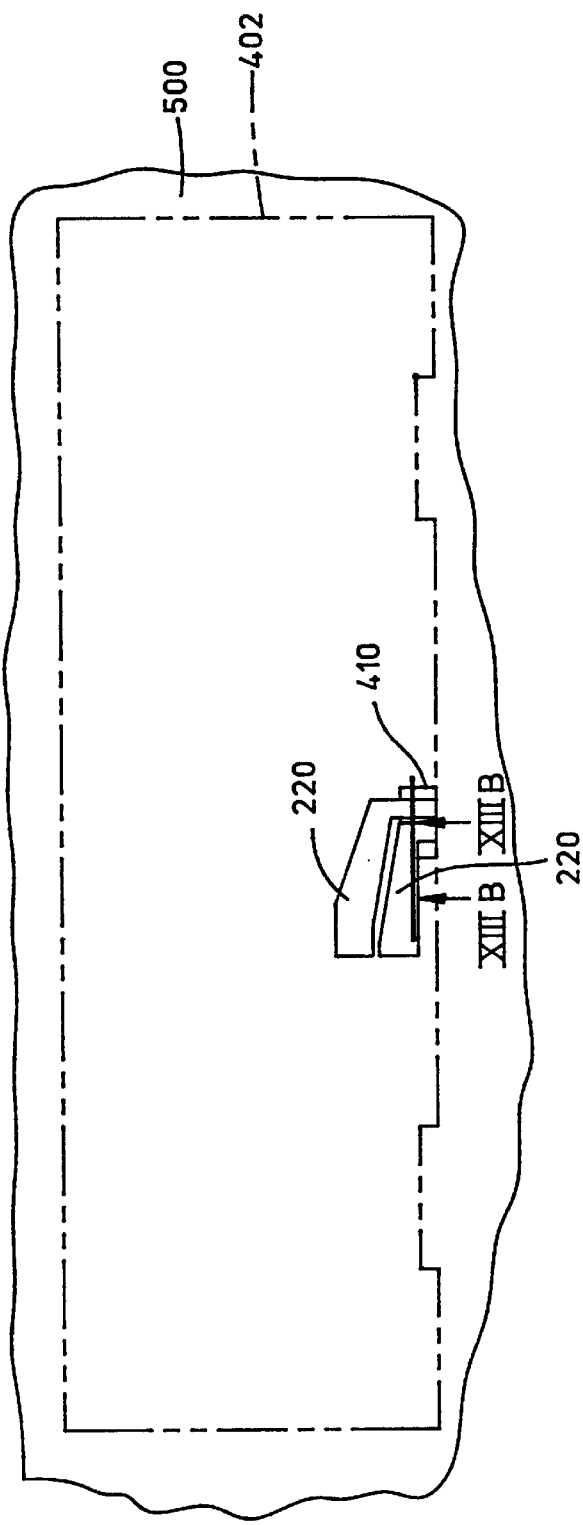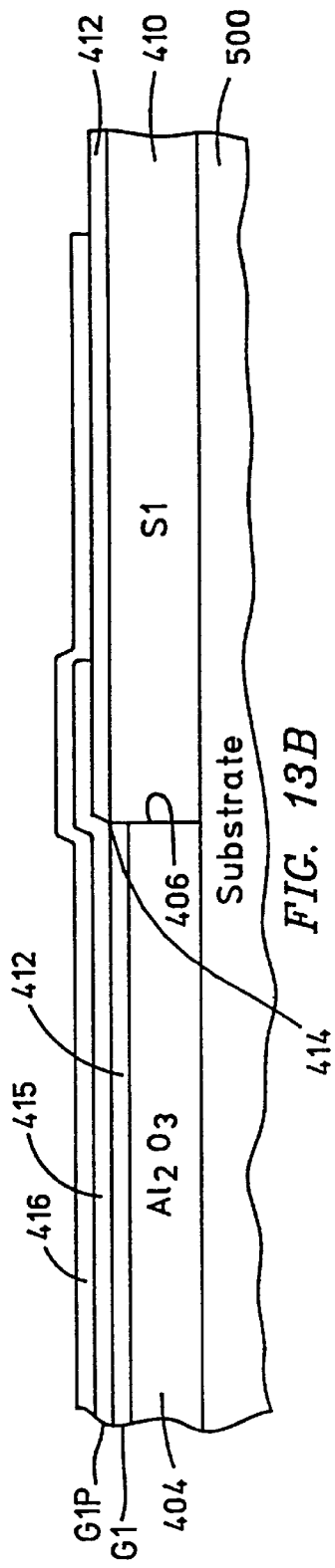
FIG. 13A
FIG. 13B

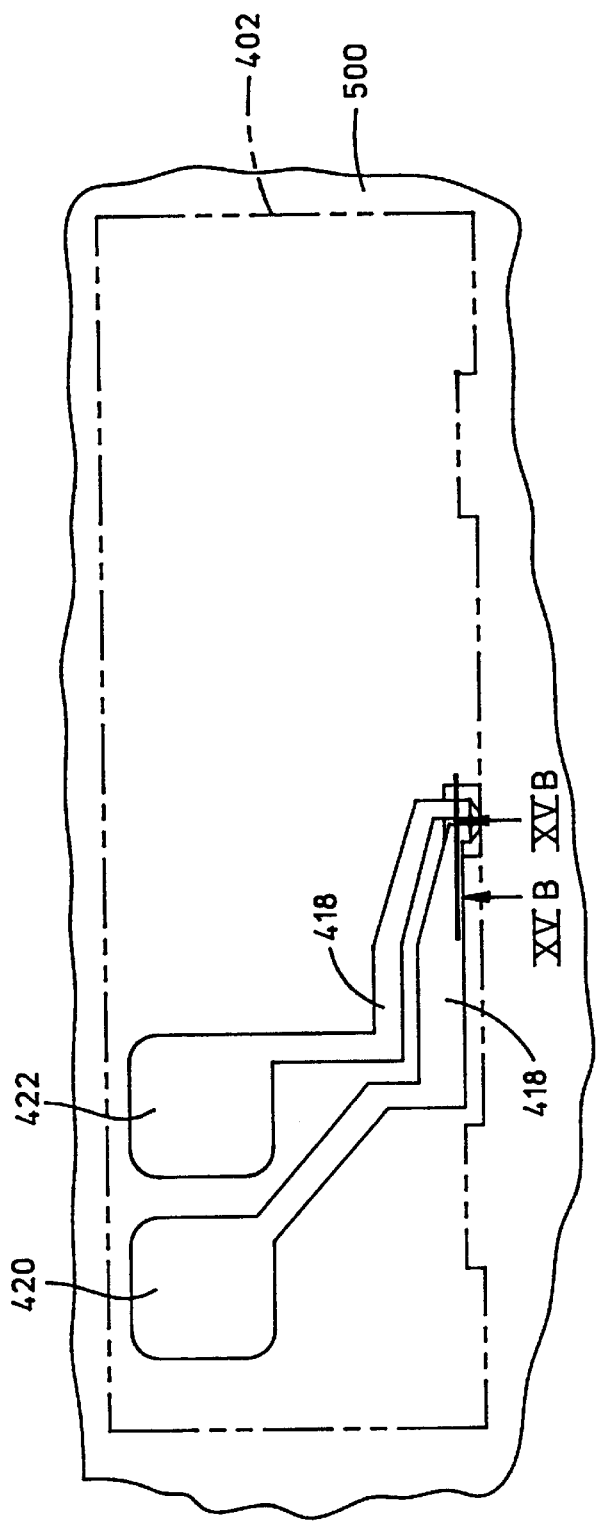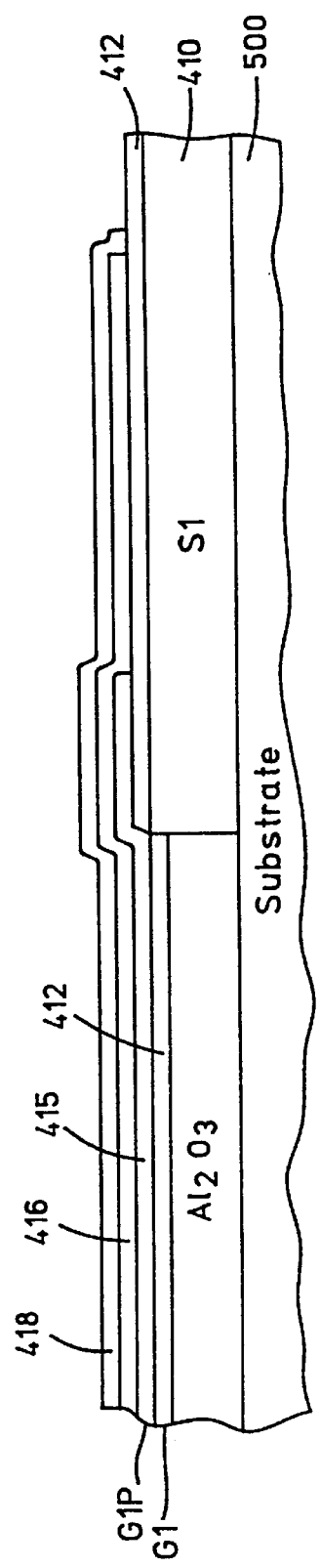
FIG. 15A
FIG. 15B

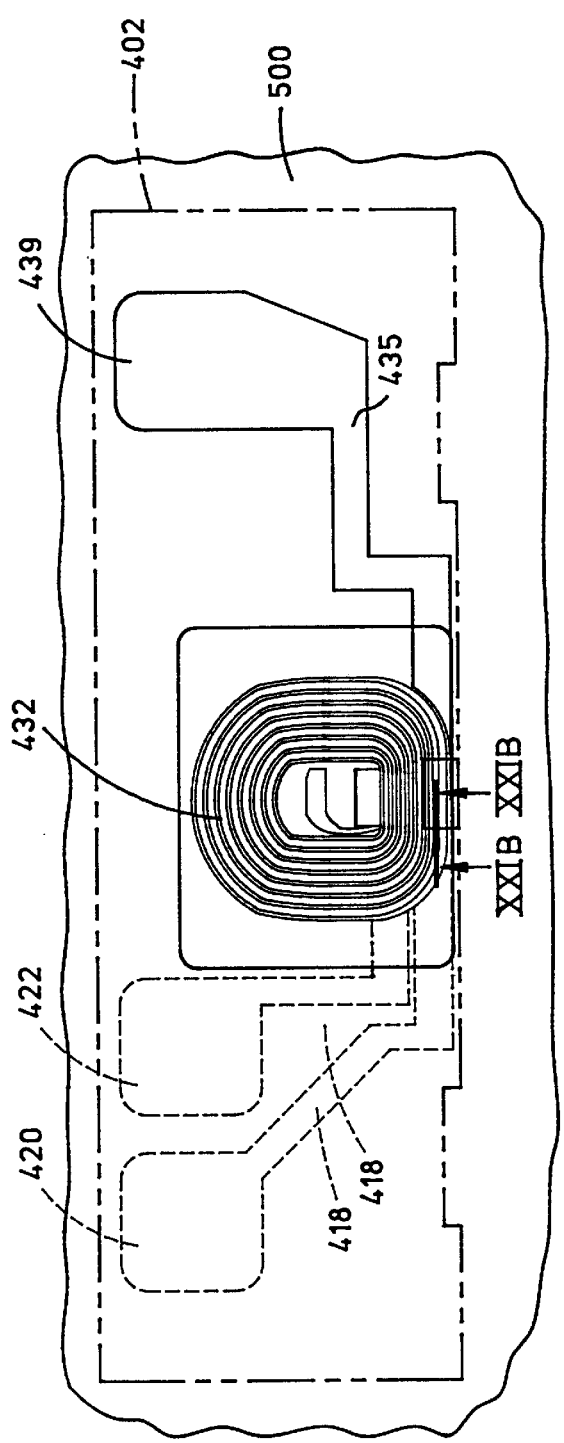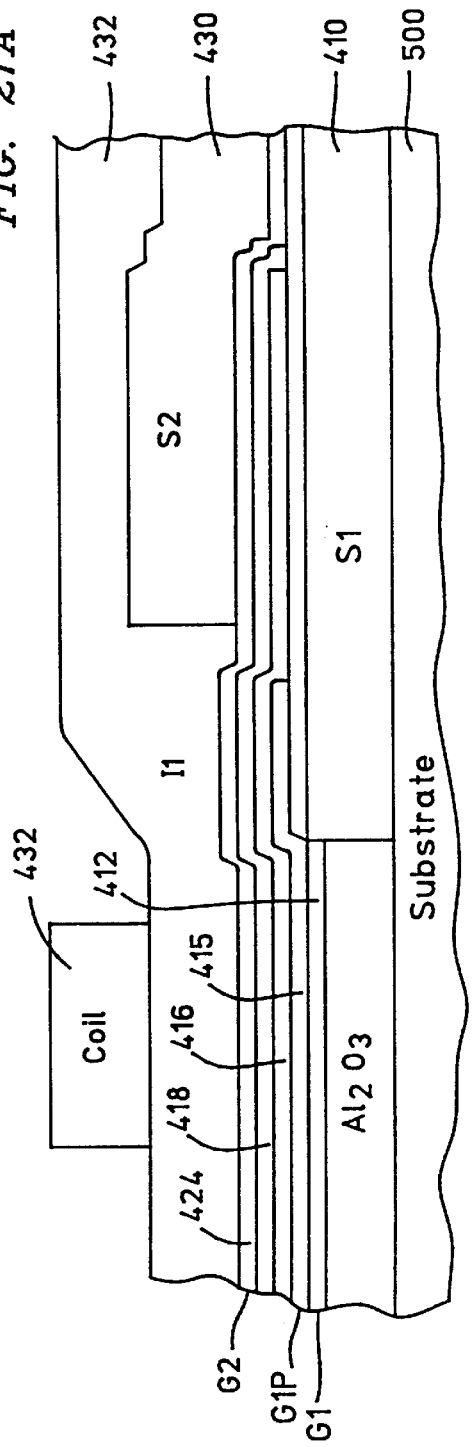

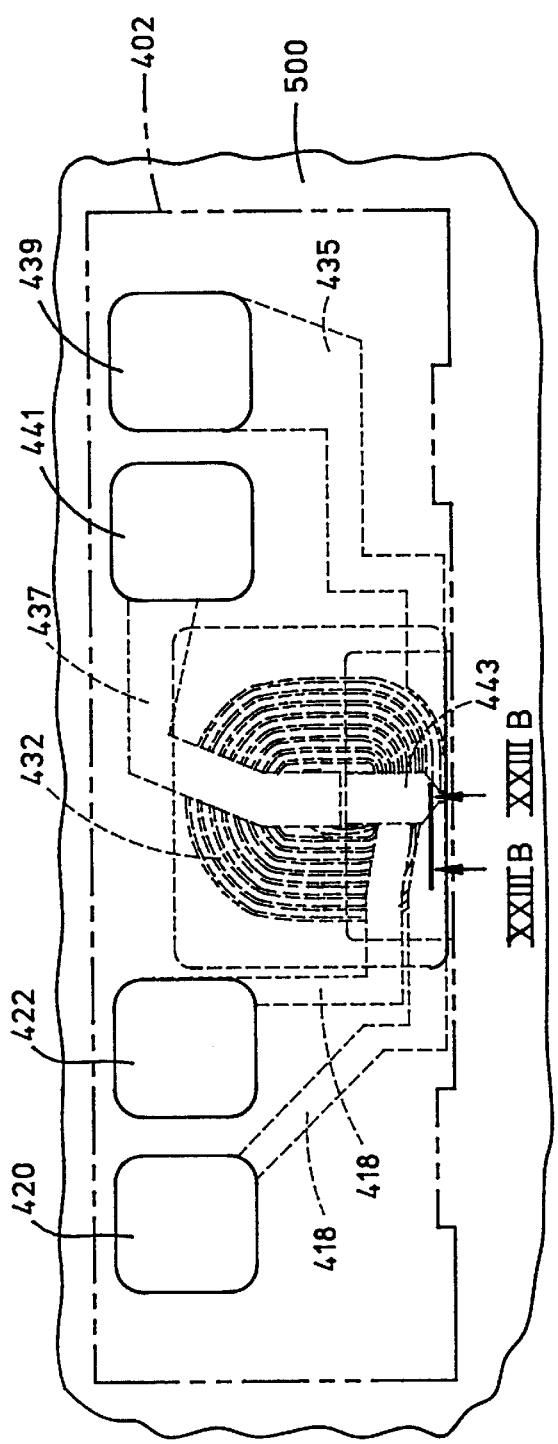
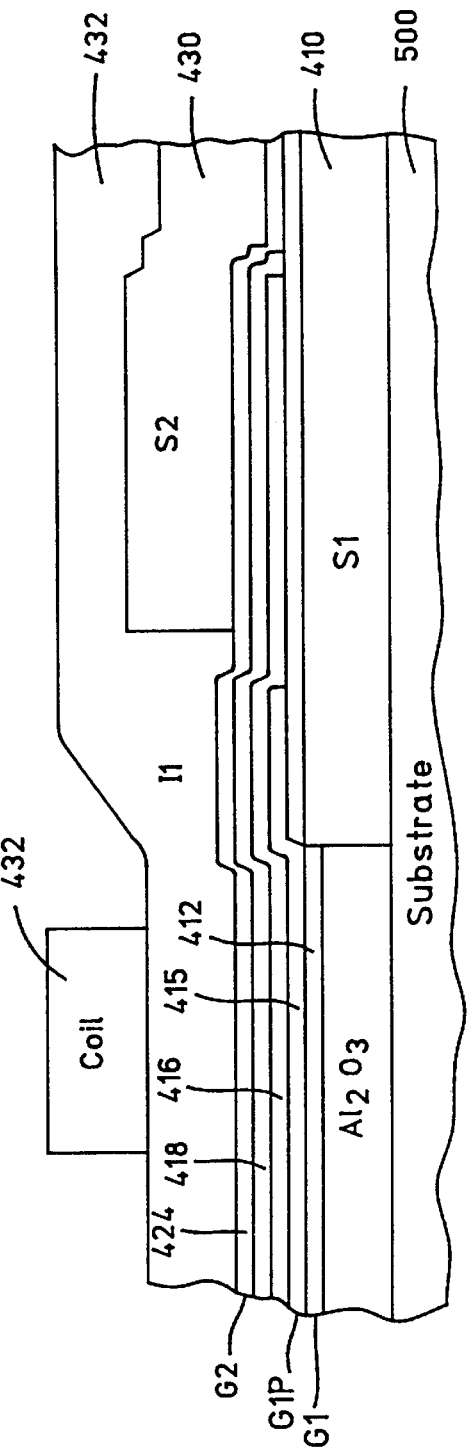
FIG. 23A
FIG. 23B

METHOD OF MAKING MAGNETIC HEAD WITH VIALESS LEAD LAYERS FROM MR SENSOR TO PADS

CROSS REFERENCE TO RELATED APPLICATION

This application is a divisional application of application Ser. No. 08/873,520 filed Jun. 12, 1997 which issued as U.S. Pat. No. 5,936,811.

BACKGROUND OF THE INVENTION

1. Field of the Invention

The present invention relates to a magnetic head that merges read and write portions with vialess lead layers from a magnetoresistive (MR) sensor to exit pads and more particularly to first and second lead layers which are connected at first ends to the MR sensor and are connected at second ends to first and second exit pads wherein the first and second leads do not have any vias between the MR sensor and the first and second exit pads.

2. Description of the Related Art

A write head is typically combined with a magnetoresistive (MR) read head to form a merged MR head, certain elements of which are exposed at an air bearing surface (ABS). The write head comprises first and second pole pieces connected at a back gap recessed from the ABS. The first and second pole pieces have first and second pole tips, respectively, which terminate at the ABS. An insulation stack, which comprises a plurality of insulation layers, is sandwiched between the first and second pole pieces, and a coil layer is embedded in the insulation stack. A processing circuit is connected to the coil layer for providing write current to the coil layer which, in turn, induces magnetic fields (called "write fields") in the first and second pole pieces. A non-magnetic gap layer is sandwiched between the first and second pole tips so that write fields of the first and second pole tips at the ABS fringe across the gap layer.

In a magnetic disk drive, a magnetic disk is rotated adjacent to and a short distance (fly height) from the ABS so that the write fields magnetize the disk along circular tracks. The written circular tracks then contain magnetized segments with fields detectable by a read head.

An MR read head includes an MR sensor sandwiched between first and second non-magnetic gap layers and located at the ABS. The first and second gap layers and the MR sensor are sandwiched between first and second shield layers. In a merged MR head, one layer serves as the second shield layer and the first pole piece. The MR sensor detects magnetic fields from the circular tracks of the rotating disk by a change in resistance which corresponds to the strength of the fields. A sense current conducted through the MR sensor results in voltage changes received by the processing circuitry as readback signals. The MR sensor may be an anisotropic MR (AMR) sensor or a spin valve sensor.

One or more merged MR heads may be employed in a magnetic disk drive for reading and writing information on circular tracks of a rotating disk. A merged MR head is mounted on a slider carried on a suspension. The suspension is mounted to an actuator which rotates the magnetic head to locations corresponding to desired tracks. As the disk rotates, an air cushion is generated between the rotating disk and an air bearing surface (ABS) of the slider. The force of the air cushion against the air bearing surface is opposed by the opposite loading force of the suspension, causing the magnetic head to be suspended a slight distance (flying height) from the surface of the disk. Flying heights are typically on the order of about 0.05 $\mu$m.

Magnetic heads are made in rows and columns on a wafer substrate. A full film of first shield material is deposited on the wafer, followed by patterning the full film into first shield material at each head site, which approximates the size of a trailing edge of the slider. While the description will now be addressed to making a single magnetic head at a single magnetic head site, the description applies to all of the magnetic head sites on a wafer. In the prior art, final patterning of the first shield comes in a subsequent step. A first gap is formed on the first shield material. An MR stripe of the MR sensor and a very thin initial set of leads are then formed on the first gap material, with first ends of the leads connected to the MR stripe and other films formed to complete the MR sensor. An intermediate or stitched set of leads that is recessed from the ABS is then formed on top of the initial set of leads, except over small portions of the initial set of leads adjacent the MR sensor, in order to increase conductivity for the sense current to the MR sensor. A second gap layer is then formed on the MR sensor, the leads, and the first shield layer, followed by patterning the first shield layer to a final size. This size is typically 250 $\mu$m along the ABS by 100 $\mu$m recessed into the head from the ABS. The second shield layer is then formed, followed by deposition of a hard baked photoresist layer that provides the first insulation layer of the insulation stack. A via is formed through the hard baked photoresist layer to second end portions of the intermediate set of leads. The first insulation layer is patterned with a via in the same location either prior to or after forming the hard baked photoresist layer. Simultaneously with forming a coil layer on the hard baked resist layer, a final set of leads is formed, extending from the via to first and second pad sites. A third lead connected to one end of the coil to a third pad site may also be formed. The via makes connection between the final set of leads and the intermediate set of leads of the read head. The remainder of the head is completed by forming one or more additional insulation layers on the coil layer, forming the second pole piece and fourth lead from the other end of the coil to a fourth pad site, forming vias at the pad sites, plating studs in the vias, forming an overcoat, and depositing gold pads that connect to the studs. This is followed by dicing the wafer into rows of heads, lapping each row of heads to form an air bearing surface, and dicing the row of heads into individual sliders, each slider having a respective magnetic head at a trailing edge thereof.

The above process requires many steps to make the leads for the read head. Since the first shield is patterned after forming the initial and intermediate set of leads, a via is required in the second insulation layer as well as the hard baked resist to connect the final set of leads to the intermediate leads. The sizes of the initial and intermediate leads dictate the size of the first shield layer, making it larger than required to shield the MR sensor. The primary purpose of the first and second shield layers is to shield the MR sensor from upstream and downstream fields along the track of the magnetic disk, so that linear resolution and bit density are promoted. For this purpose alone, the area of the first shield layer can be reduced to about 1% the size described hereinabove. This would lead to additional benefit by reducing the inductance of the write coil, permitting higher frequencies of operation and therefore higher bit throughput. In sizing the first and second shield layers, stray magnetic fields must also be taken into account. It would be desirable if the designer could design the size of the first shield layer without being constrained by sizing the first shield layer to accommodate the initial and intermediate set of leads. It would further be desirable if the number of processing steps required to form a merged head could be lessened.

SUMMARY OF THE INVENTION

A magnetic head embodying my invention has an extremely small first shield layer and first and second read leads that extend from a magnetoresistive (MR) sensor to first and second pads without any vias therebetween. This is accomplished by patterning the first shield layer into its final shape before the first gap layer and subsequent layers are formed. An alumina mask having a recess at the ABS that is the size of the first shield layer is formed, followed by formation of the first shield layer in the recess. A very thin first gap layer is then formed. The thin first gap layer may be accompanied by an optional supplemental first gap layer, the supplemental first gap layer insulating any potential exposure of the first shield layer at its junction with the alumina layer. After constructing the MR sensor, first and second leads for the MR sensor are constructed that extend from the MR sensor to the sites of the first and second pads. Each of these leads may comprise a single thin film, or, alternatively, a first thin film connected to the MR and extending past a boundary of the first shield layer and a second thin film overlaying the first film and extending from a location slightly spaced from the MR sensor to the first and second pad sites. With this arrangement, the leads for the read head extend from the MR sensor to the pad sites, without any vias, thereby eliminating processing steps. Further, since the size of the shield is not dictated by the size of the initial leads, the first shield layer can be much smaller, resulting in a more robust head than provided by prior art manufacturing methods.

An object of the present invention is to construct a merged magnetic head having a first shield layer whose size is not dictated by the size of an initial set of leads for the read head portion of the merged head.

Another object is to provide a merged magnetic head with a first shield layer that is significantly smaller than first shield layers of prior art merged heads.

A further object is to provide a merged magnetic head with sustained read resolution while lowering write inductance.

Still another object is to provide a merged magnetic head in which an MR sensor is connected to pads without any vias therebetween.

Still a further object is to provide a method of making a merged magnetic head that requires fewer process steps than prior art methods to form leads from the MR sensor to pad sites, and wherein the size of the first shield layer is not constrained by the size of such leads.

Other objects and attendant advantages of the invention will be appreciated upon reading the following description taken together with the drawings.

BRIEF DESCRIPTION OF THE DRAWINGS

FIG. 5 is a partial view of the slider and magnetic head as seen in plane V—V of FIG. 2;

FIG. 7 is a partial ABS view of the slider taken along plane VII—VII to show the read and write elements of the magnetic head;

FIG. 8A is a plan view of a prior art combined magnetic read and write head;

FIG. 8B is a view taken along plane XIII B—XIII B of FIG. 8A;

FIG. 9A is plan view of the present combined magnetic read and write head;

FIG. 9B is a view taken along plane IX B—IX B of FIG. 9A;

FIGS. 11A, 11B, 13A, 13B, 15A, 15B, 17A, 17B, 19A, 19B, 21A, 21B, 23A and 23B show various steps in the construction of the present combined magnetic head;

FIG. 10A is a plan view of a portion of a wafer with a supplemental first gap layer shown thereon, the trailing edge of a slider being shown in phantom;

FIG. 10B is view taken along plane X B—X B of FIG. 10A;

FIG. 11A is a plan view of a wafer employed in a construction of the present magnetic head with the first shield layer shown in full and the trailing edge of a slider shown in phantom;

FIG. 11B is a view taken along XI B—XI B of FIG. 11A;

FIG. 12A is a plan view similar to FIG. 10A except the first films of first and second leads have been deposited;

FIG. 12B is a view taken along plane XII B—XII B of FIG. 12A;

FIG. 13A is similar to FIG. 11A except first films of first and second lead layers have been formed;

FIG. 13B is a view taken along plane XIII B—XIII B of FIG. 13A;

FIG. 14A is similar to FIG. 12A except a second thin film of the first and second leads has been deposited over the first films;

FIG. 14B is a view taken along plane XIV B—XIV B of FIG. 14A;

FIG. 15A is similar to FIG. 13A except second thin films of the first and second lead layers have been formed on top of the first thin films to the first and second pads;

FIG. 15B is a view taken along plane XV B—XV B of FIG. 15A;

FIG. 16A is similar to FIG. 14A except a second shield layer has been constructed;

FIG. 16B is a view taken along plane XVI B—XVI B of FIG. 16A;

FIG. 17A is similar to FIG. 15A except a second gap layer and a second shield layer have been deposited;

FIG. 17B is a view taken along plane XVII B—XVII B of FIG. 17A;

FIG. 18A is similar to FIG. 16A except a hard baked photoresist layer has been deposited to provide insulation for the coils;

FIG. 18B is a view taken along plane XVIII B—XVIII B of FIG. 18A;

FIG. 19A is similar to FIG. 17A except a hard baked photoresist layer is deposited to provide insulation for the coils;

FIG. 19B is a view taken along plane XIX B—XIX B of FIG. 19A;

FIG. 20A is similar to FIG. 18A except the coil has been deposited along with third thin films of the first and second leads which extend from the vias to first and second pads and a third lead which extends from the coil to a third pad;

FIG. 20B is a view taken along plane XX B—XX B of FIG. 20A;

FIG. 21A is similar to FIG. 19A except the coil has been deposited along with a third lead to a third pad;

FIG. 21B is a view taken along plane XXI B—XXI B of FIG. 21A;

FIG. 22A is a similar to FIG. 20A except an insulation layer has been deposited, a fourth lead from the coil to a fourth pad has been deposited and a second pole tip has been formed;

FIG. 22B is a view taken along plane XXII B—XXII B of FIG. 21A;

FIG. 23A is similar to FIG. 21A except an insulation layer has been deposited, a third lead from the coil to a fourth pad has been formed and a second pole tip has been formed;

FIG. 23B is a view taken along plane XXIII B—XXIII B of FIG. 23A.

DESCRIPTION OF THE PREFERRED EMBODIMENT

Figure 1:
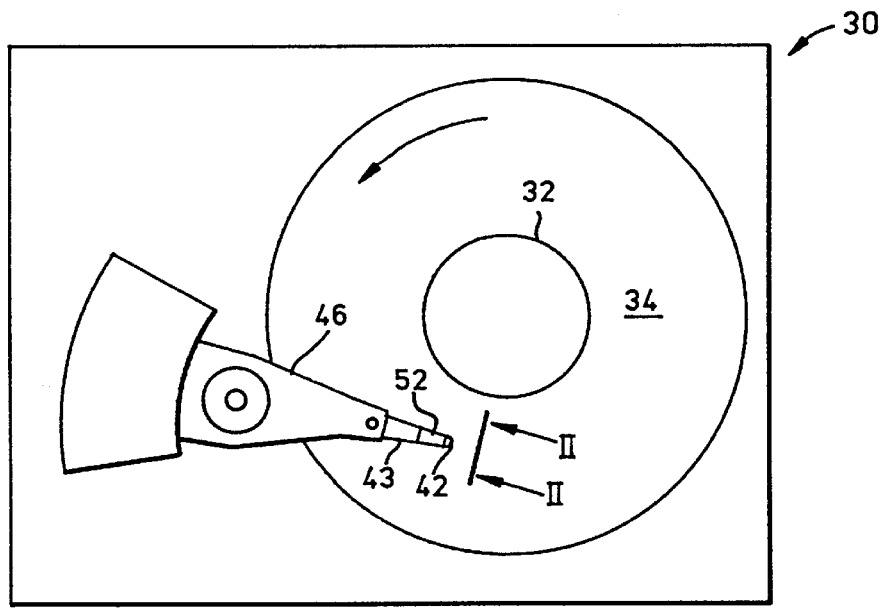
FIG. 1 is a planar view of an exemplary magnetic disk drive.
Figure 2:
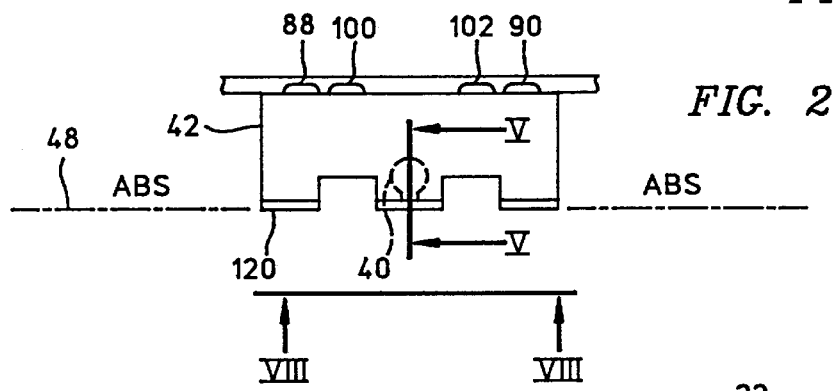
FIG. 2 is an end view of a slider with a magnetic head of the disk drive as seen in plane II—II.
Figure 3:
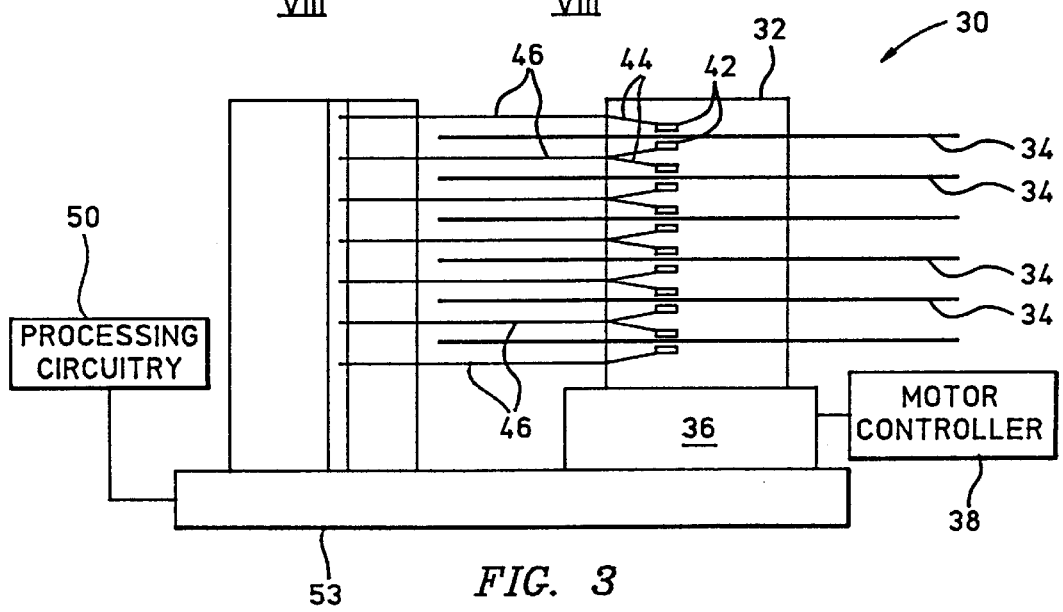
FIG. 3 is an elevation view of the magnetic disk drive wherein multiple disks and magnetic heads are employed.

Referring now to the drawings wherein like reference numerals designate like or similar parts throughout the several views there is illustrated in FIGS. 1–3 a magnetic disk drive 30. The drive 30 includes a spindle 32 which supports and rotates a magnetic disk 34. The spindle 32 is rotated by a motor 36 which, in turn, is controlled by a motor controller 38. A merged magnetic head 40 for reading and recording is mounted on a slider 42 which, in turn, is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 to locate the magnetic head 40 in a transducing relationship with a surface of the magnetic disk 34. When the disk 34 is rotated by the motor 36, the slider is supported on a thin (typically, 0.05 $\mu$m) cushion of air (air bearing) between the disk and an air bearing surface (ABS) 48.

Figure 4:
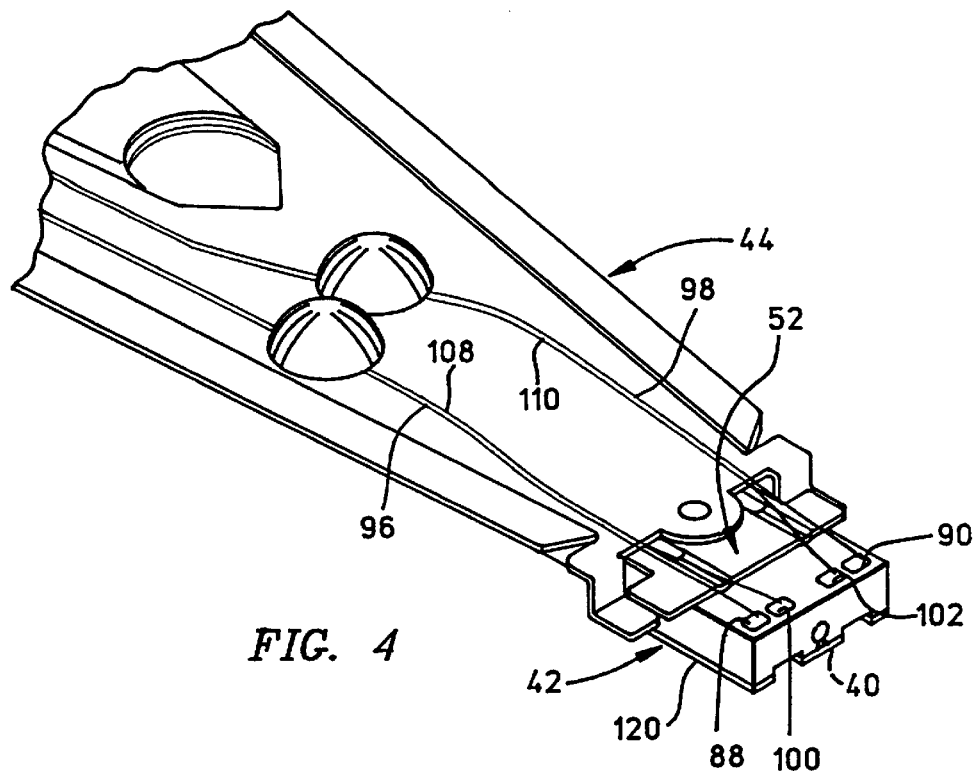
FIG. 4 is an isometric illustration of an exemplary suspension system for supporting the slider and magnetic head.

The magnetic head 40 may then be employed for writing information to multiple circular tracks on the surface of the disk 34, as well as for reading information therefrom. Processing circuitry 50 exchanges signals representing such information with the head 40, provides motor drive signals, and also provides control signals for moving the slider 42 to various tracks. In FIGS. 1 and 4 the slider 42 is shown mounted to a head gimbal assembly (HGA) 52 which, in turn, is mounted to the suspension 44. All of the above components are supported on a base 53.

FIG. 5 is a side cross-sectional elevation view of a merged magnetoresistive (MR) head 40 which has a write head portion 54 and a read head portion 56, the read head portion employing an MR sensor 58. The MR sensor 58 is sandwiched between first and second gap layers 60 and 62 that are, in turn, sandwiched between first and second shield layers 64 and 66. In response to external magnetic fields, the resistance of the MR sensor 58 changes. A sense current conducted through the sensor causes these resistance changes to be manifested as potential changes which are processed by the processing circuitry 50 shown in FIG. 3.

Figure 6:
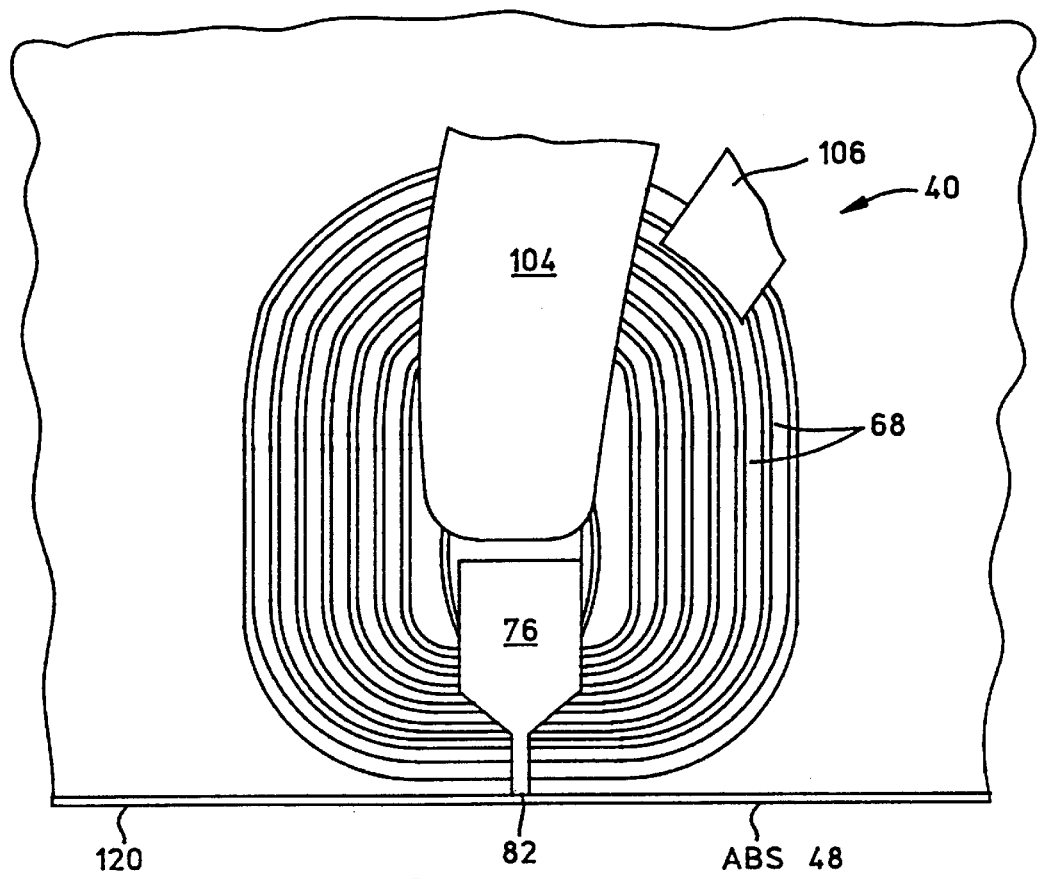
FIG. 6 is a top view of the magnetic head with all material above the second pole piece removed.

The write head portion 54 of the head includes a coil layer 68 sandwiched between first and second insulation layers 70 and 72. A third insulation layer 74 may be employed for planarizing the head to eliminate ripples in the second insulation layer caused by the coil layer 68. The first, second and third insulation layers are referred to in the art as an "insulation stack". The coil layer 68, and the first, second and third insulation layers 70, 72 and 74 are sandwiched between first and second pole piece layers 76 and 78. The first and second pole piece layers 76 and 78 are magnetically coupled at a back gap 80 and have first and second pole tips 82 and 84 which are separated by a non-magnetic gap layer 86 at the ABS. As shown in FIGS. 2 and 4, first and second bonded connections 88 and 90 connect leads (not shown) from the MR sensor 58 to leads 96 and 98 on the suspension 44 and third and fourth solder connections 100 and 102 connect leads 104 and 106 from the coil 68 (see FIG. 6) to leads 108 and 110 on the suspension. An overcoat 120 is shown at the ABS of the slider 42 covering the edges of the elements 58, 82, 84 and 86 of the magnetic head in FIGS. 2, 4, 5, 6 and 8. An overcoat is required to prevent wear and corrosion of the sensitive elements.

FIGS. 8A and 8B show a prior art slider and magnetic head assembly 200 wherein the trailing edge of the slider is shown at 202 with all of the components of the magnetic head 204 being embedded in the slider, except for first and second read pads 205 and 206 and third and fourth write pads 208 and 210. As shown in FIG. 8B, a first shield layer 212 is formed on the slider 214. On top of the first shield layer 212, a gap layer (G1) 216 is formed, and on top of the first gap layer 216, a supplemental gap layer (G1P) 218 is formed. This supplemental layer is sometimes referred to as a first gap prefill layer. While the first gap layer 216 is below the MR sensor (see layer 60 and the MR sensor 58 in FIG. 5), the supplemental gap layer 218 does not cross into the MR region, but is simply employed for thickening the gap outside of the MR sensor region to prevent shorting between the MR leads and the first shield layer. In the prior art head, the first and second leads from the MR sensor include first, second and third thin films 220, 222 and 224. The thin films 220 are the only films directly connected to the MR sensor; they extend across the first shield layer 212. The second films 222 are recessed from the ABS slightly spaced from the MR sensor and overlie the first films for increasing their conductivity.

On top of the second films 222, a second gap layer 226 is formed, which may be followed by a supplemental second gap layer (not shown). On top of the second gap layer 226, a hard baked photoresist layer is formed which operates as a first insulation layer 228 of the insulation stack. First and second vias 230 are provided through the first insulation layer 228 and the second gap layer 226 for connecting the third films 224 to the second films 222. The third films 224 are connected to the first and second pads 205 and 206 by first and second copper studs (not shown) which extend from the thin films 224 to the first and second pads 204 and 206. As shown in FIG. 8A, a coil 232 is located on top of the first insulation layer 228. One or more insulation layers 229 complete the insulation stack. The coil has third and fourth leads 234 and 236 that are connected between ends of the coil and the third and fourth pads 208 and 210 by means of copper studs as discussed hereinabove. A second pole tip is shown at 238. The ABS of the slider is shown at 240. The magnetic disk would be below the ABS and would rotate in a plane perpendicular to the plane of the drawing.

It can be seen that the prior art magnetic head requires two vias 230 for connecting the third films 224 to the first and second films 220 and 222. The vias 230 are located over the first shield 212, outside the coil region, requiring the first shield to be typically 250 μm along the ABS and recessed 100 μm into the head. The first shield is larger than required to shield the MR from upstream and downstream magnetic fields on a rotating disk. Furthermore, the size of the first shield increases the inductance of the write head, limiting its frequency response. Further, many additional processing steps are required to make the vias 230, and to form additional thin films for the first and second leads of the MR sensor.

FIGS. 9A and 9B show the magnetic head and slider assembly 400 of my invention, in which the trailing edge of the slider is shown at 402 and the magnetic head is shown generally at 403. A support layer 404, which is preferably alumina ($Al_2O_3$), is located on the slider 402 and has a recess 406 from the ABS. A first shield layer 410 is located in the recess 408, the purpose of which will be explained in more detail hereinafter. On top of the support layer 404 and the first shield layer 410 is a first gap layer 412 that extends under the MR sensor (see 58 in FIG. 5). Due to the thinness of the first gap layer 412, there is not good coverage at a potential step 414 at a junction of the support layer 404 and the first shield layer 410. In order to insulate the first shield layer 410 at this step, it may be preferable to employ a supplemental gap layer (G1P) 414 that does not extend to the MR sensor, but that covers most of the first gap layer so as to prevent electrical shorting. First conductive thin films 416 of first and second leads are connected to the MR sensor and may extend from the MR sensor to a point just beyond the coil region. The first and second leads have second films 418 that are on top of the first films 416, and that extend from near to the MR sensor to first and second pads 420 and 422.

Figure 9C:
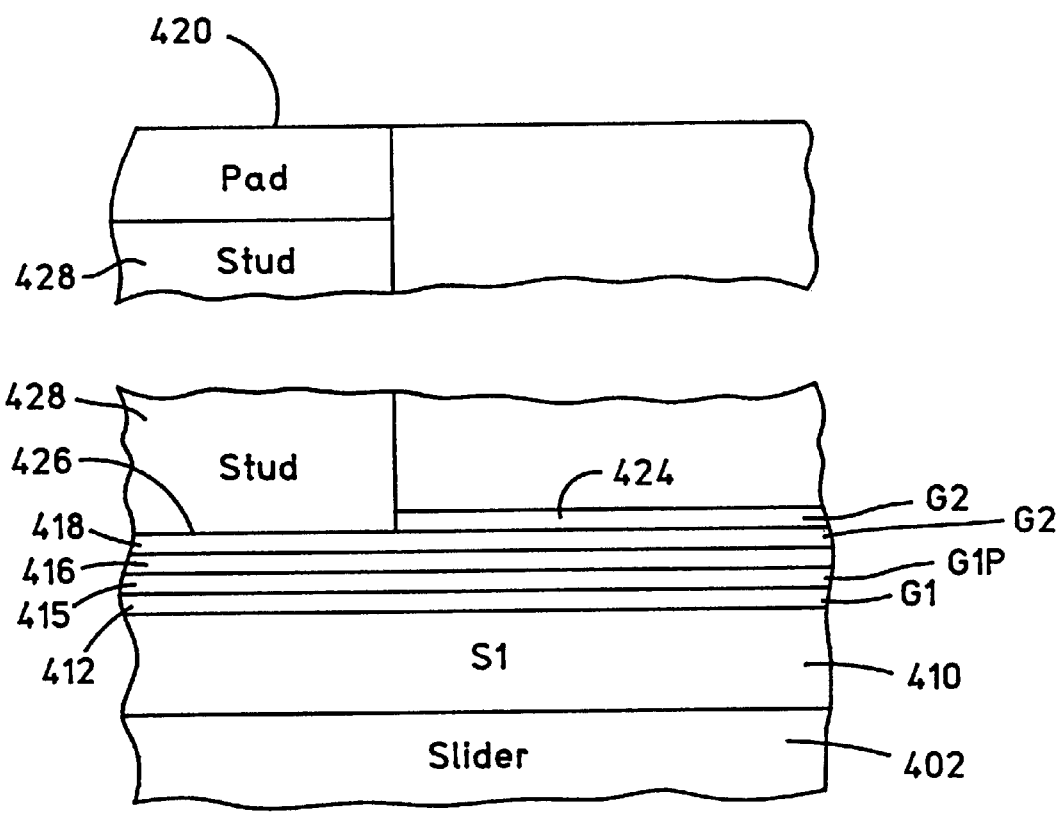
FIG. 9C is a view taken along plane IX C—IX C of FIG. 9A.

On top of the MR sensor and on top of the first and second films 416 and 418 is a second gap layer (G2) 424. The first and second films 416 and 418 are sandwiched between the first and second gap layers 412 and 424, and extend from the MR sensor to the first and second pads 420 and 422. This is also shown in FIG. 9C, where a via 426 extends through the second gap layer 424 to the second film 418. A stud 428 that is located in this via electrically connects the films 418 and 416 to the pad 420. Returning to FIG. 9B, a second shield layer 430 is shown on top of the second gap layer 424, and a hard baked photoresist layer, which forms a first insulation layer 432 of the insulation stack, is shown on top of the second shield layer 430 and the second gap layer 424. A coil 433 is located on top of the first insulation layer 432. Third and fourth leads 435 and 437 extend from opposite ends of the coil 435 to third and fourth pads 439 and 441.

Manifestly, the first and second leads (films 416 and 418) extend all the way from the MR sensor to the first and second pads 420 and 422, without any vias. If desired, the invention may employ a single film for each lead instead of a double film, in which case the single film would extend all the way from the MR sensor to the pads 420 and 422. It is preferable to use two films for each lead, however, so that the leads can be thickened and made more conductive outside of the MR region. As will become more evident from the description of the method of making the present invention, the first shield layer 410 is significantly smaller than the first shield layer of the prior art. The first shield layer of the present invention can be on the order of 50 μm along the ABS, recessed 20 μm into the head. This significantly smaller first shield layer is sufficient for shielding the MR sensor, while minimizing the inductance of the write head. Processing steps are saved with the present invention by eliminating a via for the thin films of the first and second leads between the MR sensor and the pads 420 and 422. Also, fewer thin films are required for the leads with the present invention than that required by the prior art.

FIGS. 11, 13, 15, 17, 19, 21 and 23 show the method of making the present magnetic head and FIGS. 10, 12, 14, 16, 18, 20 and 22 show the method of making the prior art magnetic head. The gap layers are insulative material, typically alumina ($Al_2O_3$), and the MR stripe of the MR sensor, the first and second shield layers and the first and second pole pieces are ferromagnetic layers, typically Permalloy ($Ni_{89}Fe_{21}$). The lead layers may be copper or gold. The coil layer is typically copper.

The non-magnetic layers and thin metal layers are typically formed by sputter deposition, while the thick metallic layers are typically formed by plating. The shape of the layers may be accomplished with a photoresist mask. Photoresist is spun onto a wafer and exposed with light in regions where the photoresist is to be removed, the removal being accomplished by a developer. If sputter deposition is performed before the mask is formed, then sputter etching or ion milling is employed to remove material exposed by the openings in the mask. If the mask is formed first while the sputter deposition is accomplished second, sputter deposition takes place at portions exposed by the mask and the sputter deposition on top of the mask is removed when the photoresist layer is dissolved in a solvent. This is referred to as a lift-off process. In forming the metallic layers, a seedlayer is first sputter-deposited to provide a return path for the plating, and then a photoresist pattern is formed on the seedlayer, with openings exposing the areas where plating is to be performed. The wafer is then placed in a plater, and the exposed portions of the seedlayer are plated. Then the photoresist is removed, leaving the desired shape of the metallic layer. This is referred to as frame plating. In some instances, the metallic layer may be formed followed by a photoresist pattern on top of the metallic layer where the metallic component is to be formed. The wafer is then subjected to ion milling to remove all portions of the metallic layer, except where the metallic layer is covered by the photoresist. The photoresist is then removed leaving the desired shape of the metallic component.

Figure 10A:
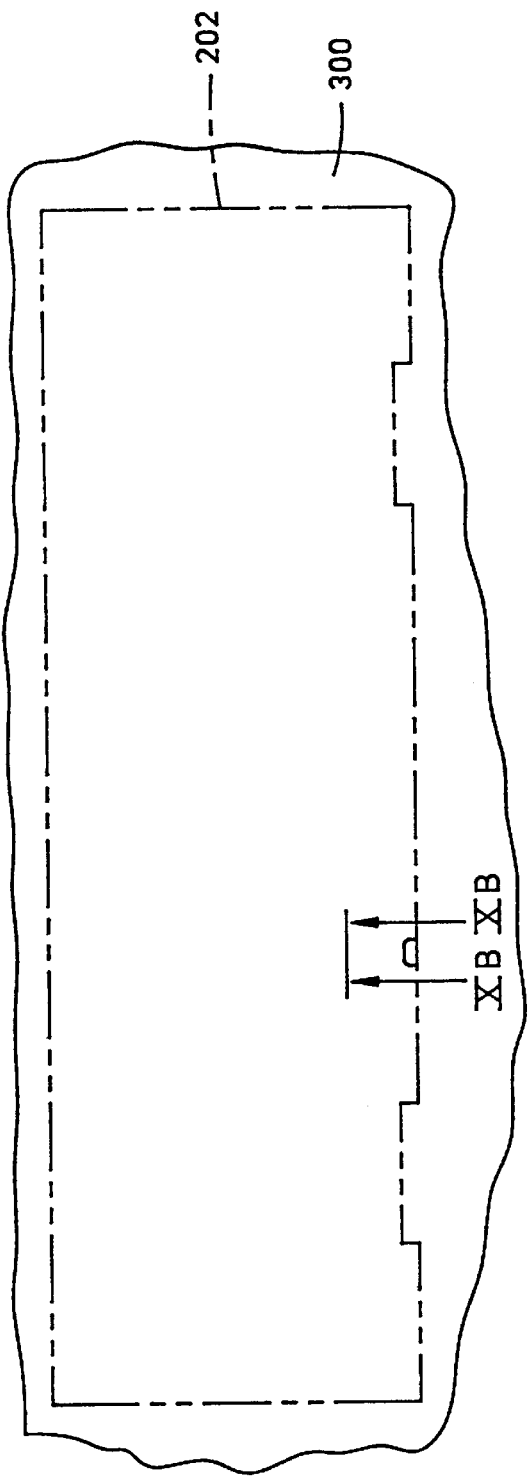
FIGS. 10A, 10B, 12A, 12B, 14A, 14B, 16A, 16B, 18A, 18B, 20A, 20B, 22A and 22B show various steps in the construction of a prior art combined magnetic head
Figure 10B:
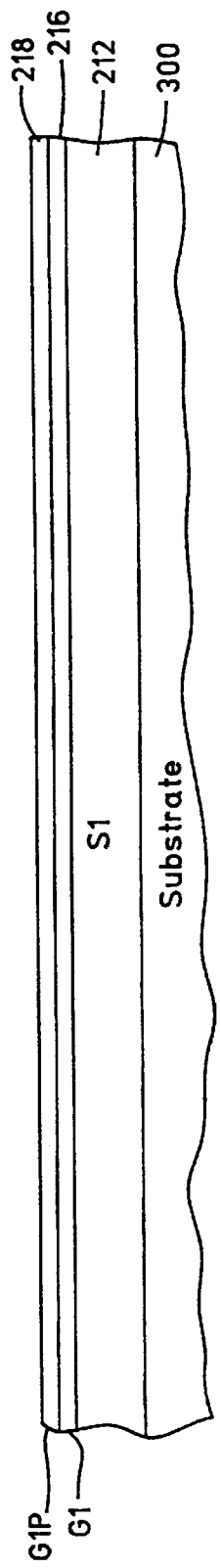

FIGS. 10A and 10B show a first step in the method of making the prior art magnetic head. The trailing edge of the slider 202 is shown in phantom on a substrate 300. It should be understood that literally thousands of small magnetic heads can be made in rows and columns on the substrate 300. After this, the wafer is diced into rows for lapping to form the ABSs. This is followed by dicing rows into individual sliders, as shown in FIGS. 8 and 9. The individual sliders are mounted on suspensions of a magnetic disk drive. In the prior art method, a full film of first shield material 212 is deposited on a wafer, as shown in FIGS. 3 and 4. A first definition (not shown) of the shield material 212 is made to open several areas on the wafer substrate for test sites. A full film first gap layer 216 is then formed on the first shield layer, followed by formation of a supplemental gap layer (G1P) 218 on the first gap layer.

Figure 11A:
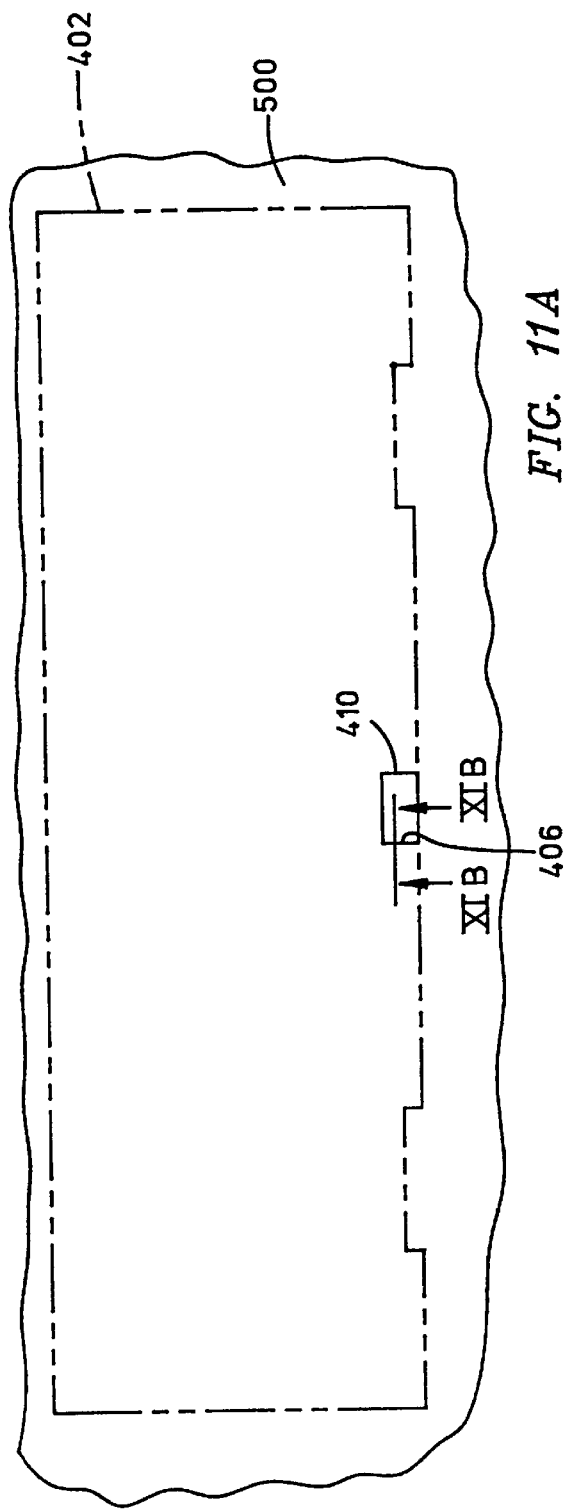
Figure 11B:
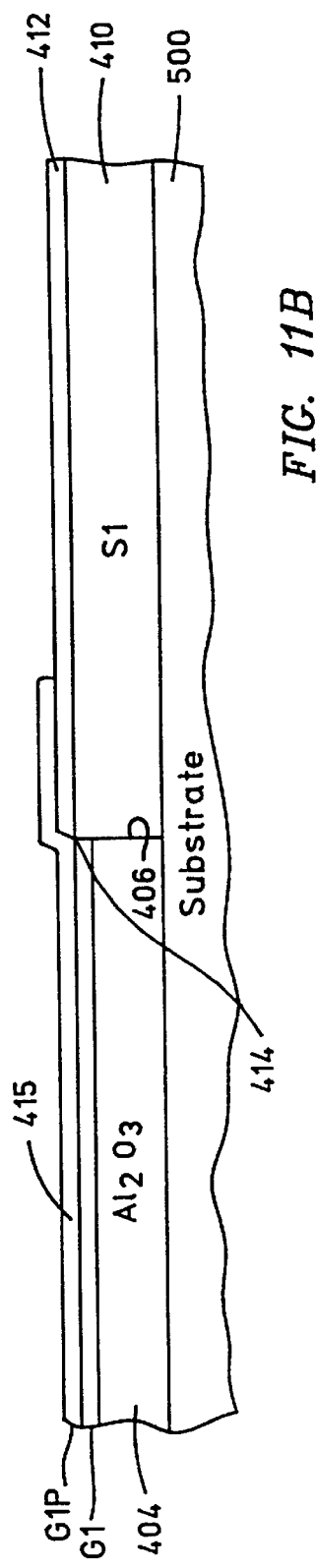

FIGS. 11A and 11B show the first step of the method of the present invention. The trailing edge of the slider is shown in phantom at 402 on a wafer substrate 500. A support layer 404 is formed on the wafer substrate, with a recess 406 from the ABS. This support layer is preferably alumina ($Al_2O_3$). The first shield 410 is formed in the recess 406 of the support layer 404. The top and bottom surfaces of these layers are intended to be co-extensive and they are substantially so.

However, there may be a step at 414, either up or down with respect to the first shield layer 410, which may expose a portion of a corner of the first shield layer 410. In order to cure this potential opening a supplemental first gap layer (G1P) 415 is employed to cover the step. Optionally, the first gap layer 412 could be made thicker which would ensure coverage of the step. However, it is desirable to maintain the first gap layer 412 as thin as possible adjacent the MR sensor so as to increase linear resolution of the magnetic head. The present invention differs from the prior art, shown in FIG. 10, in that the shield 410 is fully formed, except for subsequent lapping of the ABS.

Figure 12A:
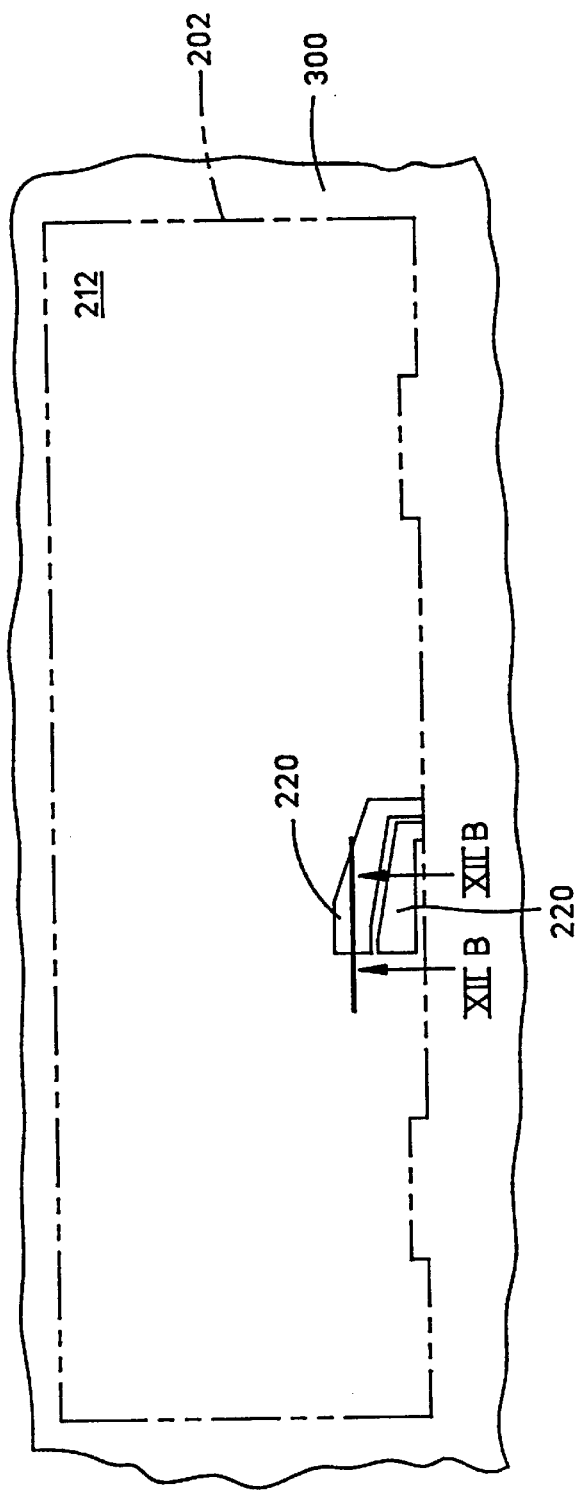
Figure 12B:
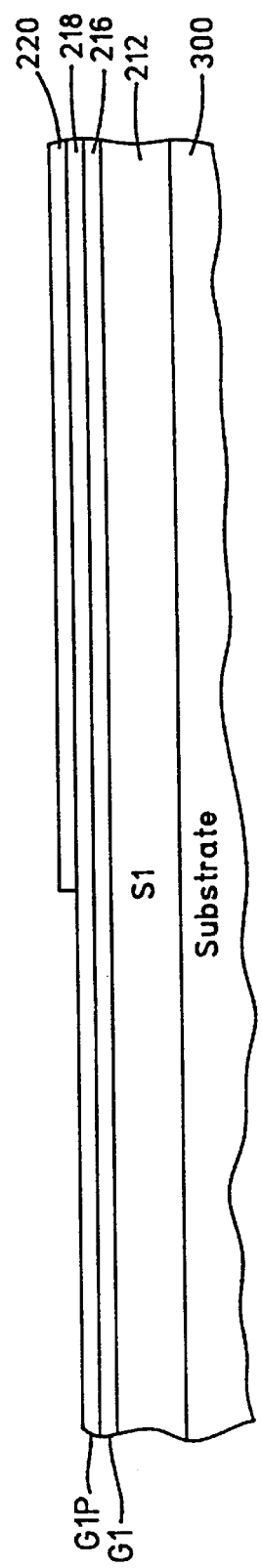

The second step in the prior art method is shown in FIGS. 12A and 12B wherein the first films 220 of the first and second leads are formed along with an MR stripe (not shown) of the MR sensor (see 58 of FIGS. 5 and 7). At this stage, the final shape of the first shield layer 212 has not been defined, and the thin films 220 are in a sea of first shield material.

As shown in FIGS. 13A and 13B the second step of the present method forms first thin films 220 of the first and second leads that are connected to the MR sensor (not shown) at the ABS. It should be noted that second ends of the first films 220 extend beyond the boundaries of the first shield layer 410, as shown in FIG. 13A. In an optional embodiment, the first and second films 220 may terminate within the boundaries of the first shield layer 412, which is less preferable than the construction described hereinabove.

Figure 14A:
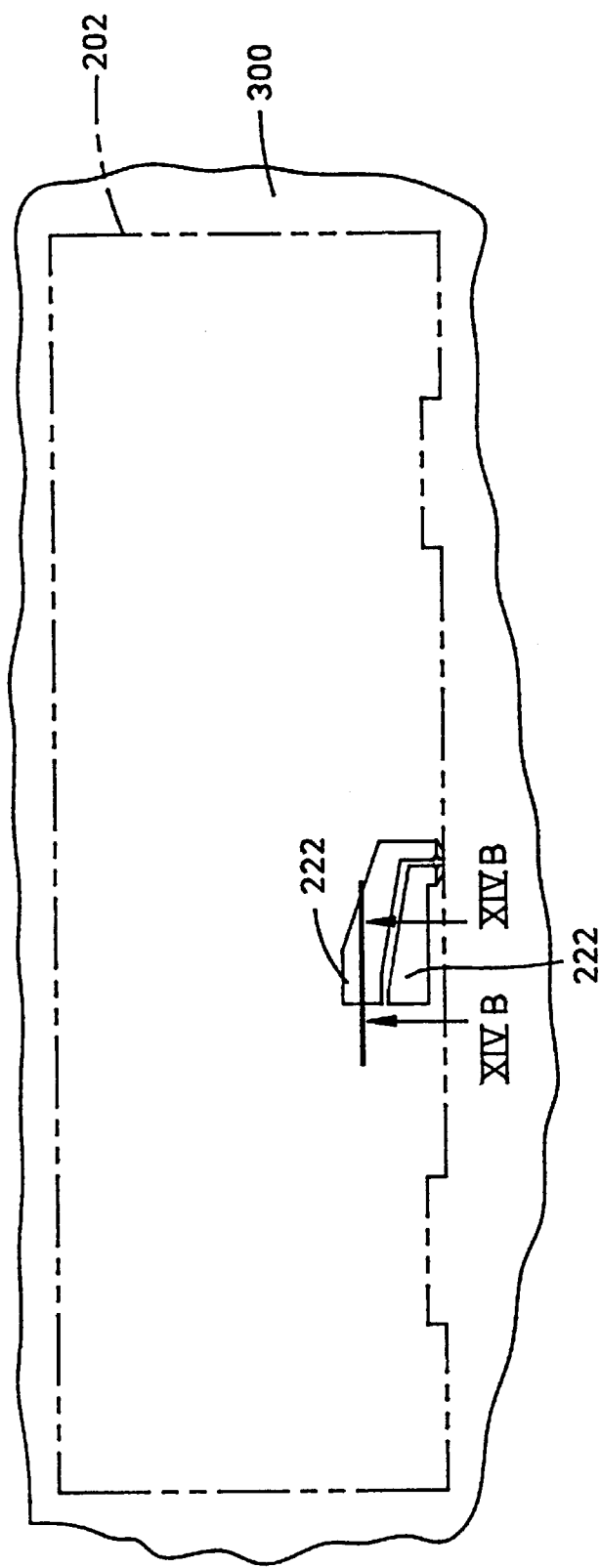
Figure 14B:
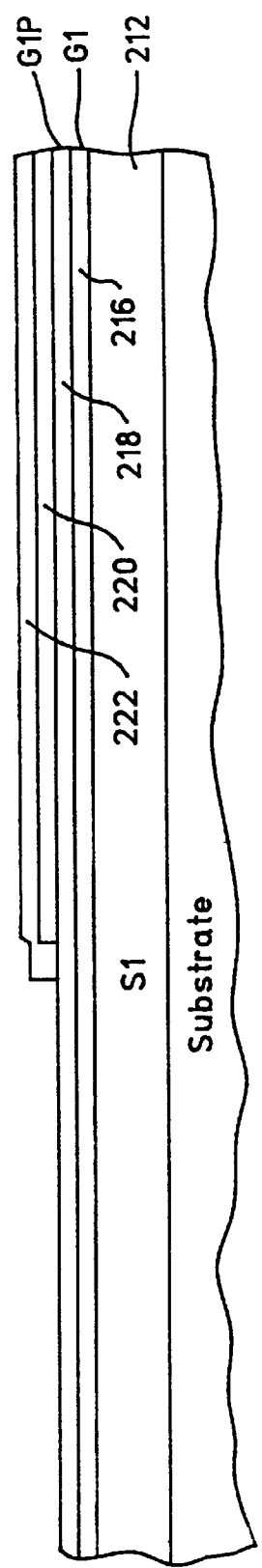

FIGS. 14A and 14B show the third step of the prior art method wherein second films 222 are formed on top of the first films 220 of the first and second leads, with first ends of the second films 222 slightly recessed from the MR sensor.

As shown in FIGS. 15A and 15B the third step of the present method forms second films 418 of the first and second leads on top of the first films 416, with first ends of the second films slightly recessed from the MR sensor, and the second end of the films terminating at pad locations 420 and 422. It should be noted that this method differs significantly from the prior art method in that the first and second leads are now fully formed with no more than two thin films 416 and 418. In an optional method a single thin film may be employed that is connected to the MR sensor, and that extends all the way to the pad locations 420 and 422. However, dual films are preferred since this will result in less lead thickness at the ABS and consequently reduced shield to element shorting.

Figure 16A:
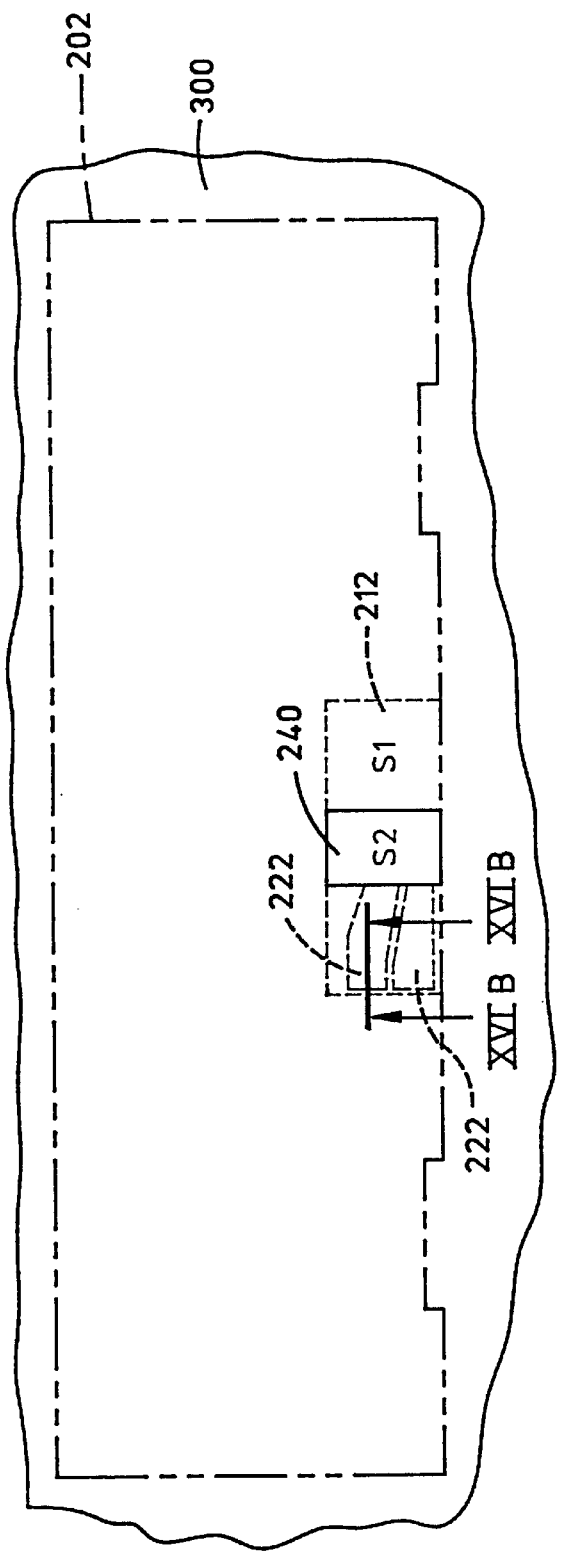
Figure 16B:
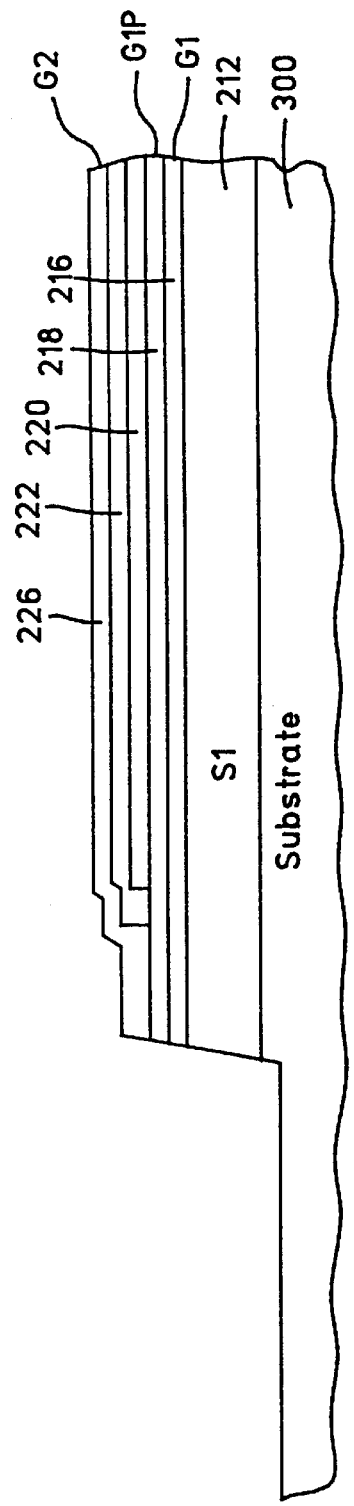

In FIGS. 16A and 16B a fourth step of the prior art method forms the second gap layer 226 on top of the second films 222 of the first and second leads. In the prior art, the first shield is typically 250 $\mu$m along the ABS, and recessed 100 $\mu$m into the head. This is followed by defining the shape of a first shield layer 212. A second shield layer 240 is then formed on top of the second gap layer 226.

Figure 17A:
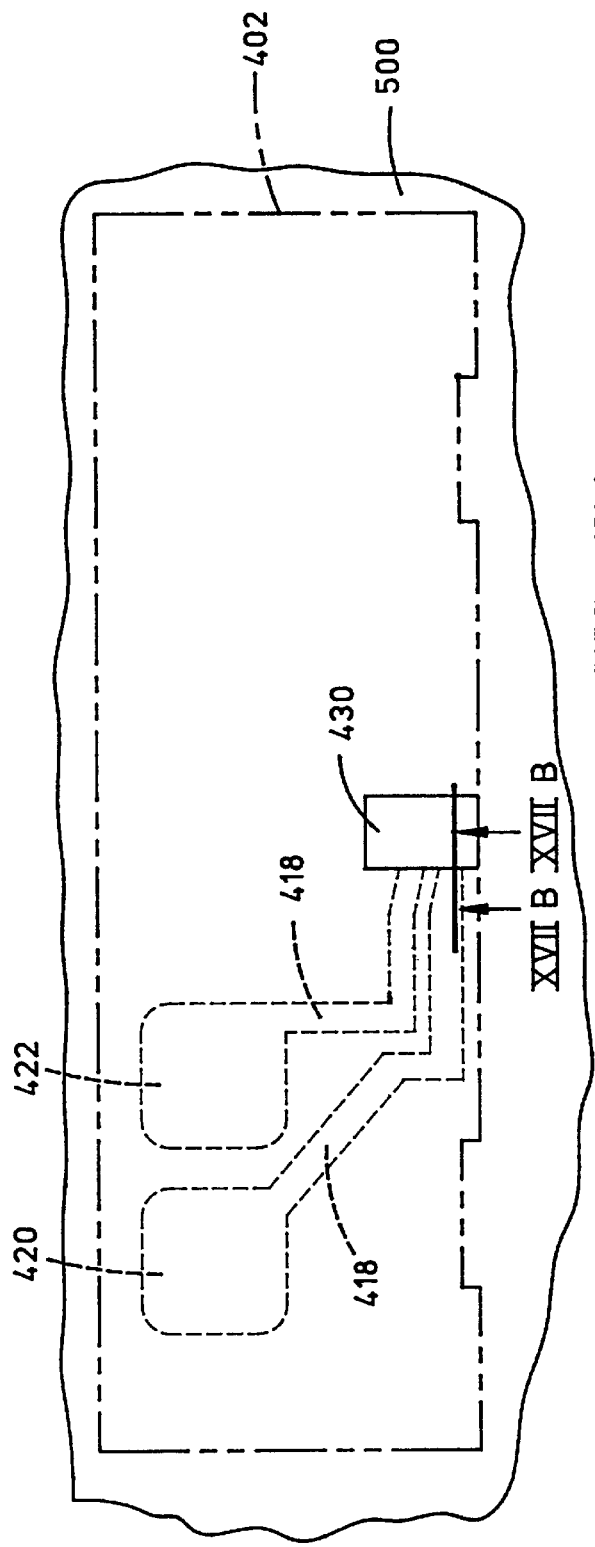
Figure 17B:
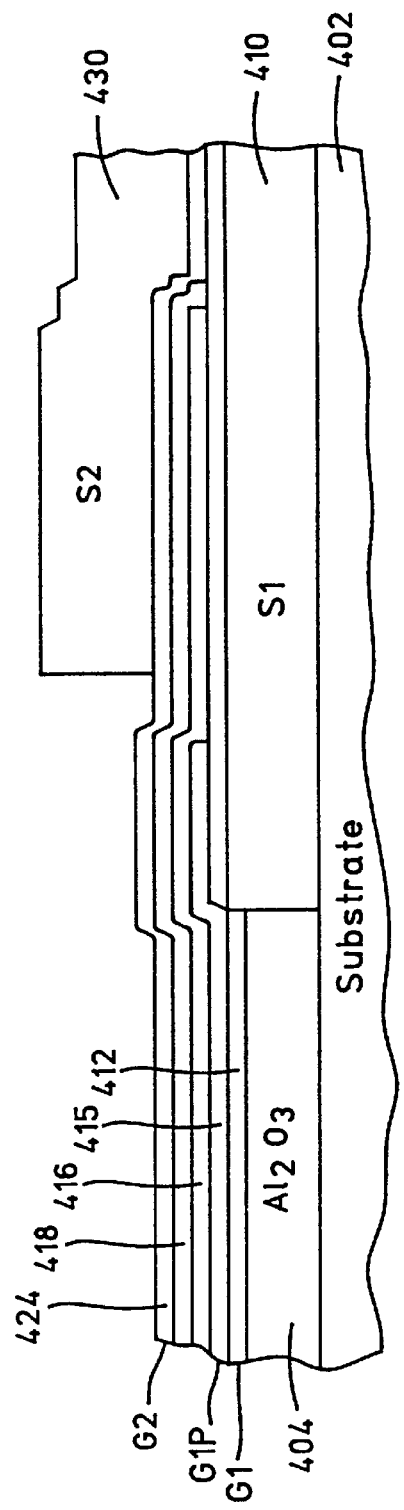

In FIGS. 17A and 17B a fourth step of the present method is shown wherein the second gap layer 424 is formed on top of the thin films 418 of the first and second lead layers. The second shield layer 430 is then formed on top of the second gap layer 424. At this stage, the first and second thin films 416 and 418 of the first and second lead layers extend substantially all the way from the MR sensor to the pad regions 420 and 422, between the first and second gap layers 412 and 424, as described hereinabove with respect to FIGS. 9A, 9B and 9C.

Figure 18A:
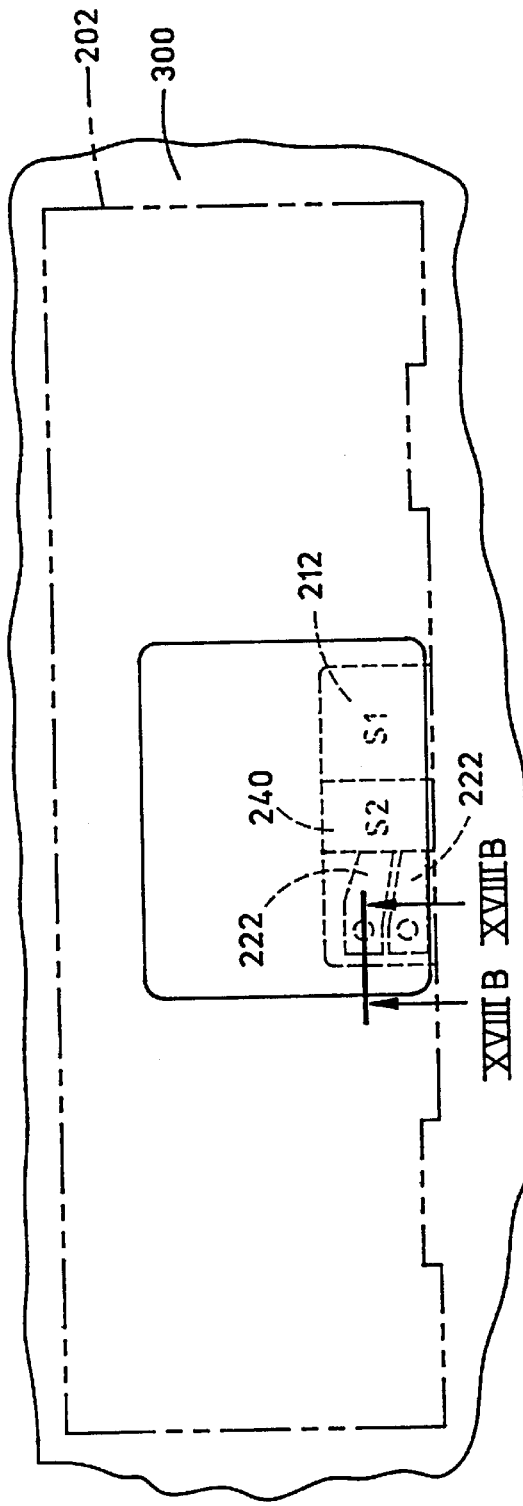
Figure 18B:
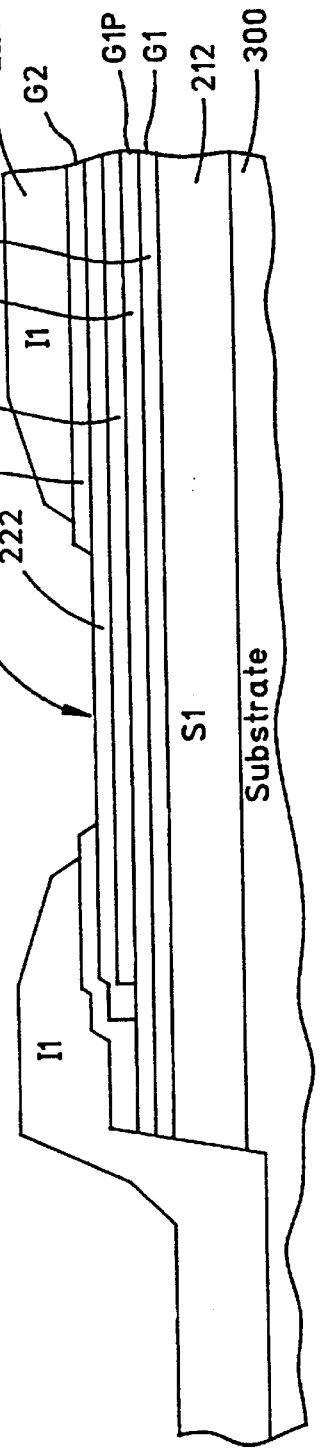

As shown in FIGS. 18A and 18B, a fifth step in the prior art forms a hard baked photoresist layer as the first insulation layer 228 on the second gap layer 226. A via 230 is then formed through the first insulation layer 228 and the second gap layer 226. Alternatively, the via could be first formed in the second gap layer 226, followed by formation of the second insulation layer 228 with an opening at the location of the via. This results in the same via as shown in FIG. 18B. This via is eliminated by the present invention, as is discussed next.

Figure 19A:
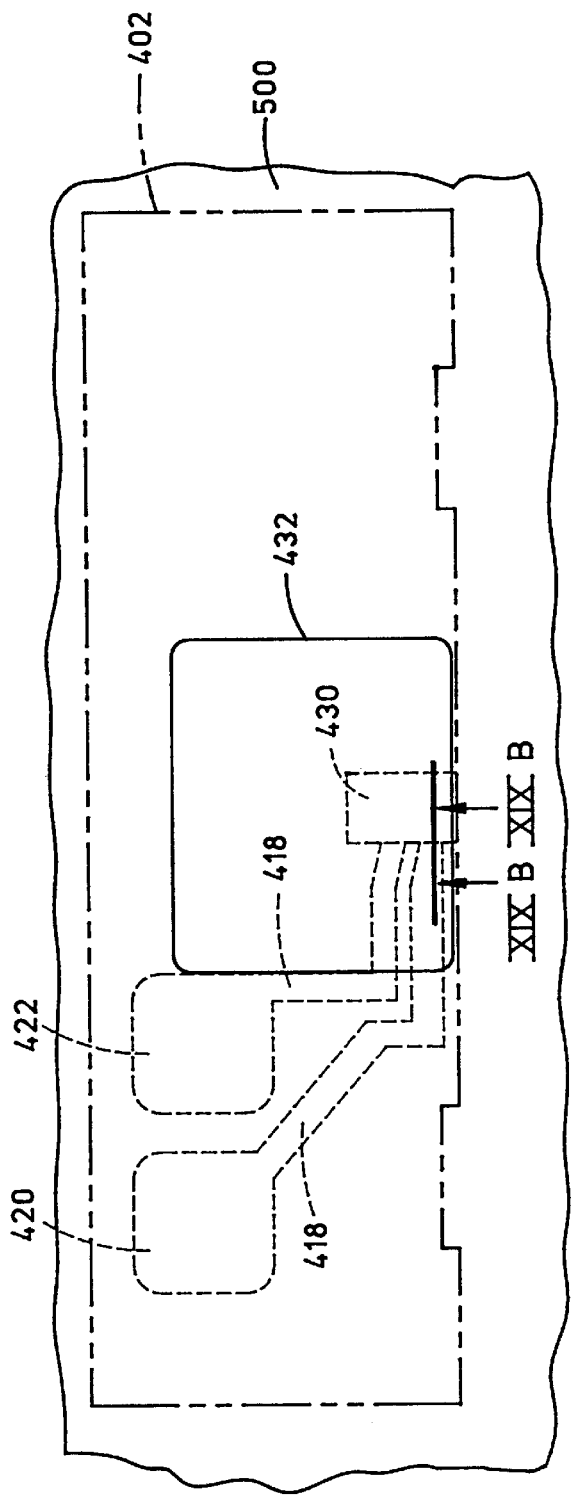
Figure 19B:
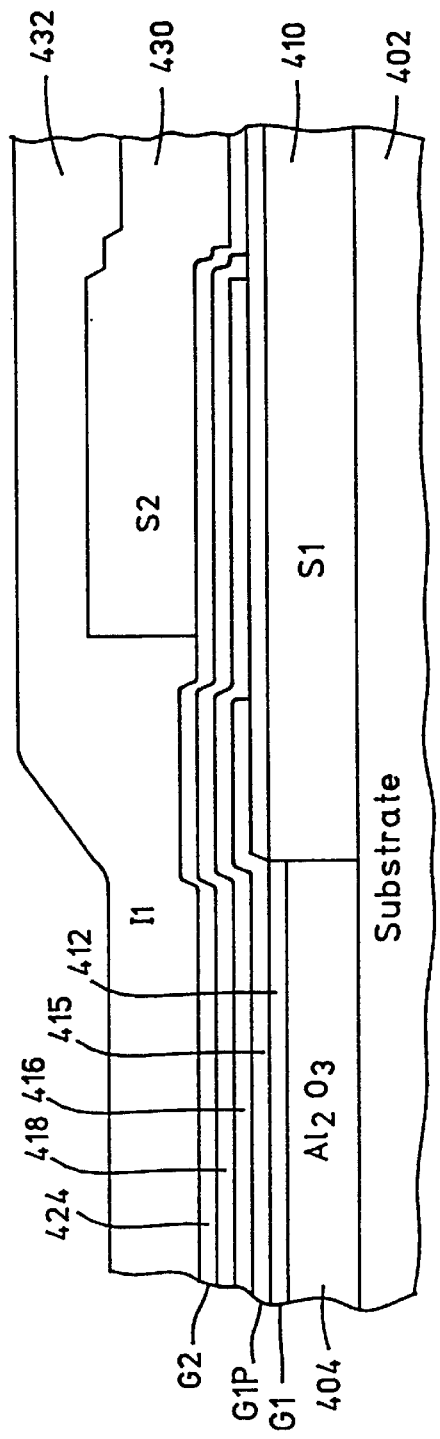

As shown in FIGS. 19A and 19B the fifth step of the present method forms the first insulation layer 432 on the second shield layer 430 and the second gap layer 424 without construction of any vias.

Figure 20A:
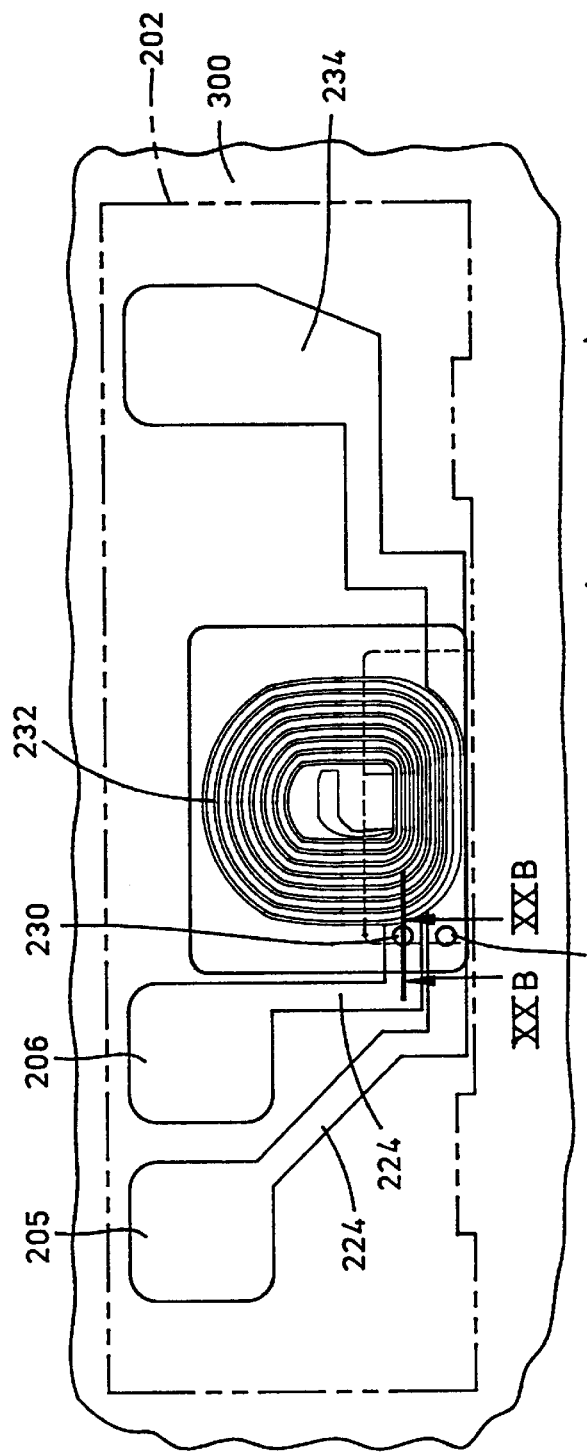
Figure 20B:
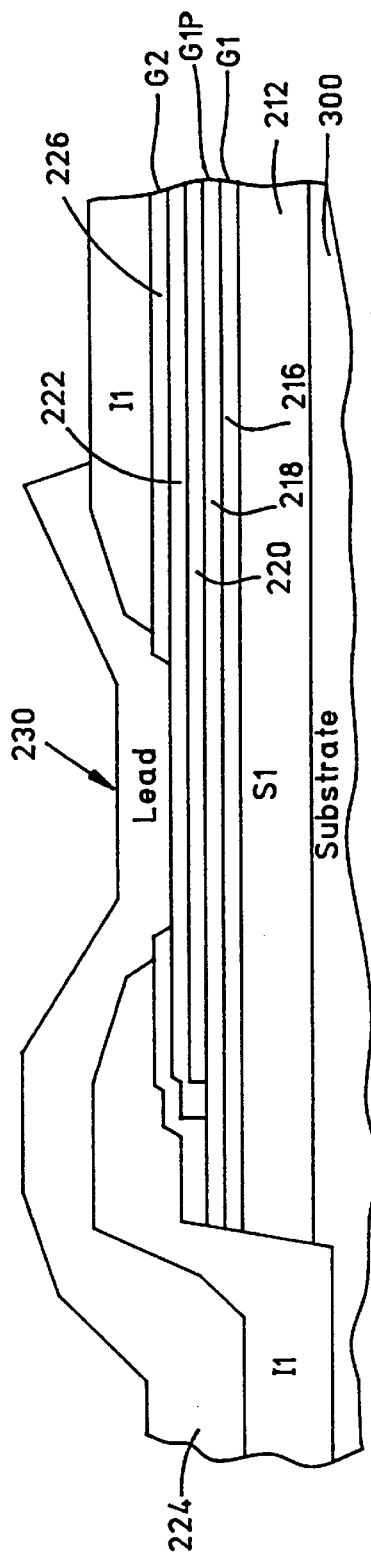

In FIGS. 20A and 20B the sixth step of the prior art method deposits the third thin films 224 of the first and second leads, with first ends of the third thin films 224 located in the vias 230 and second ends of the third thin films 224 terminating at the pads 204 and 206. Along with the third films 224, the coil layer 232 and the third lead 234 may be formed. At this point, the prior art method will have employed three thin films for the first and second leads, as contrasted to no more than two thin films for the present invention.

In FIGS. 21A and 21B, the sixth step of the present method forms the coil 433 along with the write coil lead 435, which extends to the pad region 439.

Figure 22A:
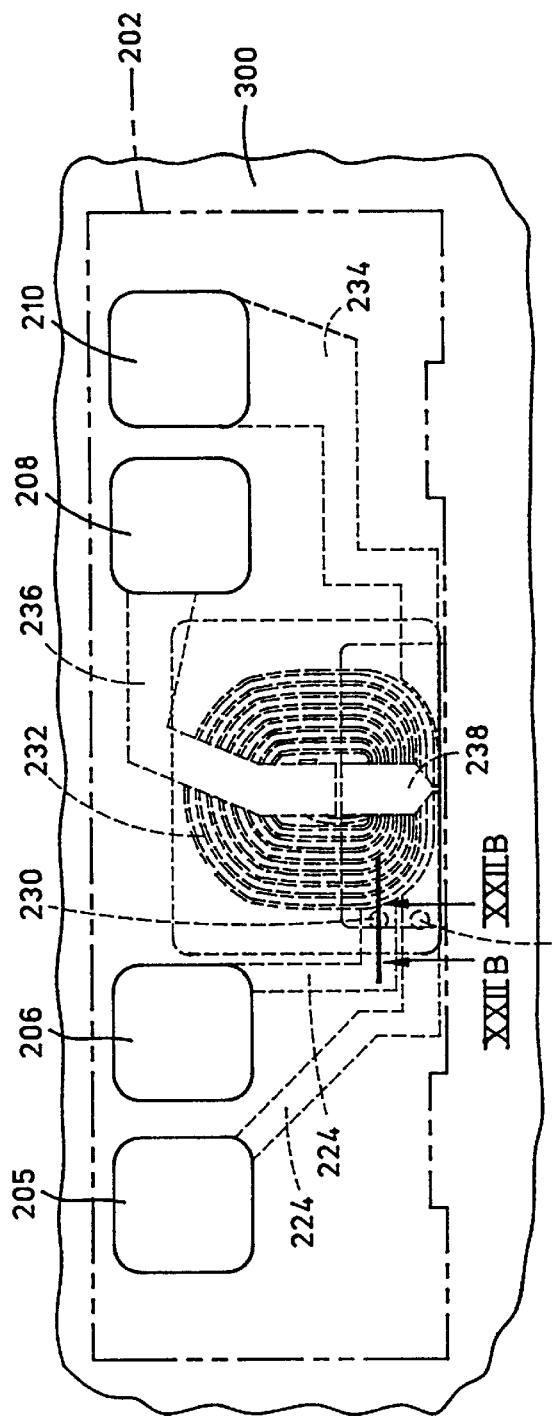
Figure 22B:
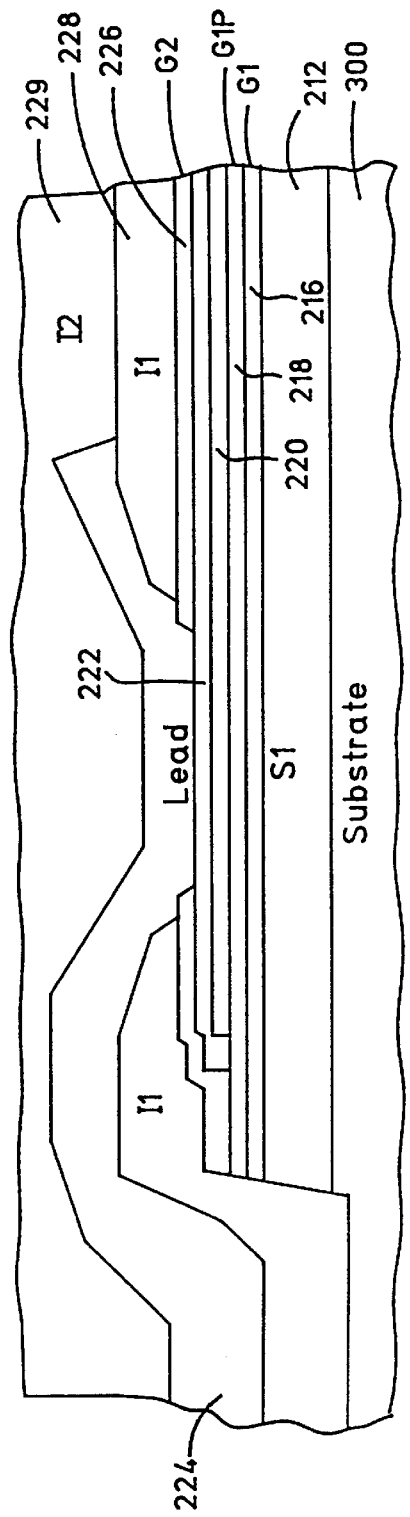

In FIGS. 22A and 22B, the seventh step of the prior art method deposits the second insulation layer 229 of the insulation stack on top of the first insulation layer 228 and the third film 224 of the first and second leads. This is followed by depositing a fourth lead 236 from the center of the coil 232 to the fourth pad 208. After forming a third insulation layer (not shown), the second pole piece 238 may be formed, followed by formation of vias at the pad regions 204, 206, 208 and 210, and formation of studs (not shown) in the vias. Next an overcoat (not shown) may be formed, and then pads at 204, 206, 208 and 210. The wafer is then processed by dicing, lapping and dicing which results in the prior art magnetic head and slider assembly 200 shown in FIGS. 8A and 8B.

As FIGS. 23A and 23B illustrate, the seventh step of the present method performs the same steps as shown in FIGS. 22A and 22B of the prior art process by forming the fourth lead 437 from the center of the coil 433 to the fourth pad 441, the second and third insulation layers (not shown), the second pole tip, making vias at the pad locations 420, 422, 439 and 441, constructing studs 428 (see FIG. 9C) in the vias, constructing the overcoat (not shown) and the pads at 420, 422, 439 and 441 (see FIG. 9C). The wafer 402 is then diced, lapped and diced resulting in the present magnetic head as shown in FIGS. 9A, 9B and 9C.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of making a combined head that has a read head and a write head wherein the combined head has a front portion bounded at a foremost end by an air bearing surface (ABS) and having first and second read pads exposed exterior the combined head for connection to leads exterior the combined head, the method comprising:

forming a support layer with a recess which extends from the ABS into the combined head;

forming a first shield layer within said recess substantially coextensive with said support layer;

forming a first gap layer on the first shield layer and the support layer;

forming a magnetoresistive (MR) sensor on the first gap layer; and forming first and second lead layers on the first gap layer with the first and second lead layers connected to the MR sensor and extending all the way from the MR sensor to said first and second read pads without any vias in any layer of the combined head.

2. The method as claimed in claim 1 comprising:

forming a first pole piece layer with a first pole tip;

forming a write gap layer on the first pole tip;

forming a first insulation layer on the first pole piece layer;

forming at least one coil layer on the first insulation layer;

forming at least a second insulation layer on the coil layer;

forming a second pole piece layer on the second insulation layer with a pole tip on the write gap layer and with an end recessed from the ABS and connected to the first pole piece layer at a back gap;

the step of forming the coil layer places a front portion of the coil layer between the first and second pole piece layers with the front portion located entirely in front of the back gap; and the steps of forming the first shield layer and forming the coil layer include positioning only said front portion of the coil layer over the first shield layer.

3. The method of claim 1 comprising:

forming a second gap layer on the MR sensor, on the lead layers and on the first gap layer;

forming said first and second read pads; and the steps of forming the first gap layer, the MR sensor, the first and second lead layers and the second gap layer including sandwiching the first and second lead layers between the first and second gap layers all the way from the MR sensor to the first and second read pads.

4. The method of claim 1 comprising:

forming a second gap layer on the MR sensor, on the first and second lead layers and on the first gap layer;

forming a second shield layer on the second gap layer; and forming said first and second read pads so that they extend through the second gap layer and have surfaces exposed outside the combined head.

5. The method of claim 1 including:

forming first and second lead layers for the read head with no more than two thin films for each of the first and second lead layers.

6. The method of claim 5 comprising:

forming said first and second pads;

the step of forming first and second lead layers including:

forming each of the first and second lead layers with first and second thin films, each of the first and second thin films having first and second ends;

connecting the first end of the first thin film of each of the first and second lead layers to the MR sensor;

forming the second thin films of the first and second lead layers with their first end portions overlying and stitched to the second end portions of the first thin films of the first and second lead layers respectively; and connecting the second ends of the second thin films to said first and second read pads.

7. The method of claim 6 wherein the step of forming the first thin film extends the first thin film laterally beyond the first shield layer.

8. The method of claim 6 wherein the step of forming the first thin film extends the first thin film beyond the first shield layer and over the support layer.

9. The method of claim 8 comprising:

forming a write coil layer with a front portion; and the step of forming the support layer and the step of forming the first shield layer forms these layers of sufficient size to underlie all of the front portion of the write coil layer after the step of forming the write coil layer.

10. The method of claim 9 wherein the support layer is alumina.

11. The method of claim 10 comprising:

the steps of forming the first shield layer and the support layer forms a junction between the first shield layer and the support layer which defines said recess; and forming a supplemental first gap layer on top of the first gap layer and spaced from the MR sensor with the supplemental first gap layer covering said junction.

12. The method of claim 11 comprising:

forming a second gap layer on the MR sensor, on the first and second lead layers, on the first gap layer and on the supplemental first gap layer;

forming a second shield layer on the second gap layer; and forming said first and second read pads so that they extend through the second gap layer and have surfaces exposed outside the combined head.

13. The method as claimed in claim 12 comprising:

forming a write gap layer and a first insulation layer on the second shield layer;

forming at least one coil layer on the first insulation layer;

forming at least a second insulation layer on the coil layer;

forming a pole piece layer on the second insulation layer with a pole tip on the write gap layer and with an end recessed from the ABS and connected to the second shield layer at a back gap;

the step of forming the coil layer places a front portion of the coil layer between the second shield layer and the pole piece layer with the front portion located entirely in front of the back gap; and the steps of forming the first shield layer and forming the coil layer include positioning only said front portion of the coil layer over the first shield layer.

14. The method of claim 1 comprising:

the steps of forming the first shield layer and the support layer forms a junction between the first shield layer and the support layer which defines said recess; and forming a supplemental first gap layer on top of the first gap layer and spaced from the MR sensor with the supplemental first gap layer covering said junction.

* * * * *